United States Patent
Tinaphong et al.

(10) Patent No.: US 7,961,111 B2
(45) Date of Patent: Jun. 14, 2011

(54) HOME CONTROL PROTECTION SYSTEM

(75) Inventors: Prapan Paul Tinaphong, Westfield, IN (US); Eric M. Michielutti, Carmel, IN (US); Louis E. Lenzi, Carmel, IN (US); Joseph Craig Engle, Carmel, IN (US)

(73) Assignee: Audiovox Corporation, Hauppage, NY (US)

( * ) Notice: Subject to any disclaimer, the term of this patent is extended or adjusted under 35 U.S.C. 154(b) by 342 days.

(21) Appl. No.: 12/317,424

(22) Filed: Dec. 23, 2008

(65) Prior Publication Data

US 2009/0207034 A1    Aug. 20, 2009

Related U.S. Application Data

(60) Provisional application No. 61/009,113, filed on Dec. 26, 2007.

(51) Int. Cl.
| G08B 21/00 | (2006.01) |
| G08B 23/00 | (2006.01) |
| H02H 3/08  | (2006.01) |
| H02H 9/02  | (2006.01) |
| H02H 1/00  | (2006.01) |
| H02H 1/04  | (2006.01) |
| H02H 3/22  | (2006.01) |
| H02H 9/06  | (2006.01) |
| H01C 7/12  | (2006.01) |
| H01R 4/60  | (2006.01) |

(52) U.S. Cl. ..... 340/638; 340/649; 340/651; 340/693.5; 361/93.1; 361/118; 439/214

(58) Field of Classification Search ............... 340/638, 340/639, 649–652, 693.1, 693.5; 361/115, 361/118, 119, 142, 170, 634, 635, 679.01, 361/93.1, 102; 439/214, 620.21
See application file for complete search history.

(56) References Cited

U.S. PATENT DOCUMENTS

| 4,907,118 | A |   | 3/1990  | Hames         | 361/56   |
| 5,010,438 | A |   | 4/1991  | Brady         | 361/56   |
| 5,053,919 | A |   | 10/1991 | Schacht       | 361/363  |
| 5,844,763 | A |   | 12/1998 | Grace et al.  | 361/111  |
| 5,963,414 | A | * | 10/1999 | Bird          | 361/119  |
| 5,982,603 | A |   | 11/1999 | Choi          | 361/119  |
| 6,881,076 | B2|   | 4/2005  | Baker         | 439/76.1 |
| 7,402,060 | B1| * | 7/2008  | Buzil et al.  | 439/214  |
| 7,457,106 | B2| * | 11/2008 | Ewing et al.  | 361/623  |
| 7,561,388 | B2| * | 7/2009  | Sung et al.   | 361/42   |
| 2002/0141127 | A1 |   | 10/2002 | Daugherty  | 361/111 |
| 2003/0151874 | A1 |   | 8/2003  | Shipp       | 361/126 |
| 2005/0047049 | A1 | * | 3/2005  | Bell et al. | 361/118 |
| 2005/0105235 | A1 | * | 5/2005  | Yu          | 361/118 |
| 2006/0072269 | A1 | * | 4/2006  | Staples     | 361/93.1|
| 2007/0002511 | A1 |   | 1/2007  | Chaudhry    | 361/118 |
| 2007/0086141 | A1 |   | 4/2007  | Elms        | 361/118 |
| 2007/0097584 | A1 |   | 5/2007  | Ducharme et al. | 361/118 |
| 2007/0109710 | A1 | * | 5/2007  | Milan       | 361/118 |
| 2007/0188962 | A1 |   | 8/2007  | Baldwin     | 361/118 |

* cited by examiner

Primary Examiner — Jennifer Mehmood
(74) Attorney, Agent, or Firm — Gerald T. Bodner

(57) ABSTRACT

A home control protection system includes at least one surge protection strip having a plurality of power outlet receptacles, and a wall mountable central control unit that is in electrical communication with the at least one surge protection strip. The surge protection strip includes a replaceable surge protector module. The surge protection strip includes a circuit for detecting and counting the number of power surges which are shunted by the surge protector module, and compares the number of power surges with a predetermined threshold power surge number that corresponds to a predicted maximum number of power surges before failure of the surge protector module will occur.

43 Claims, 20 Drawing Sheets

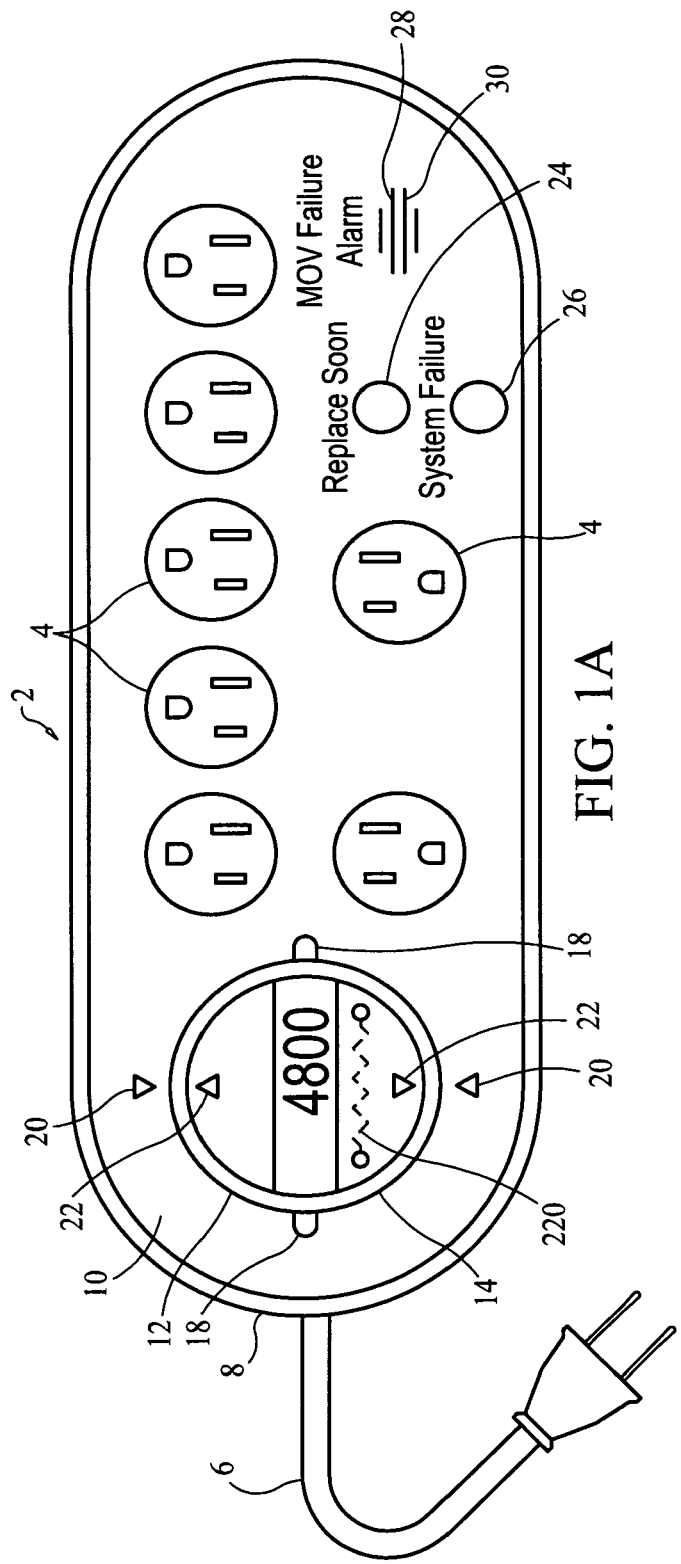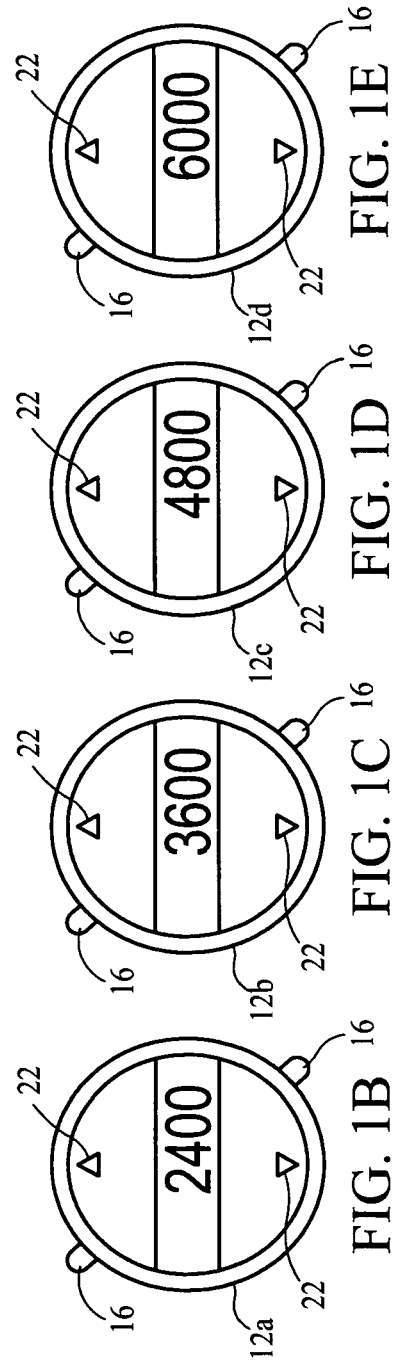

HOME CONTROL PROTECTION SYSTEM

CROSS-REFERENCE TO RELATED APPLICATION

This application is related to U.S. Provisional Application Ser. No. 61/009,113, filed on Dec. 26, 2007, and entitled "Home Control Protection System", the disclosure of which is incorporated herein by reference. This application claims the benefit of priority under 35 U.S.C. 119 and/or 35 U.S.C. 120 to the aforementioned related provisional application.

BACKGROUND OF THE INVENTION

1. Field of the Invention

This invention generally relates to surge protection devices and equipment for a home or office, and more specifically relates to surge protection systems which incorporate diagnostic circuitry.

2. Description of the Prior Art

Surge protectors commonly utilize metal oxide varistors (MOVs) as transient voltage surge suppression devices. Over time, MOVs degrade from continued exposure to power surges. Conventionally, when surge protectors fail due to a malfunction or failure of an internal or external MOV, the surge protector may cease to operate, notify the user of failure or a combination of both. When a surge protector fails or malfunctions, in some instances the entire device must be replaced. However, some conventional surge protectors have removable MOVs that may be replaced in the event of failure or malfunction as opposed to replacing the entire surge protector device which can be costly.

Some conventional surge protectors are capable of notifying the user when a MOV has degraded; however, these surge protectors offer no indication of the actual level of degradation. Users of such surge protection devices may assume that the level of degradation is minor and continue use of the protector without replacement. In such instances, the user places unnecessary risk on all the components connected to the surge protector as the MOV might actually be completely degraded and the next surge might damage the electronics. In other instances, a user might choose to replace the MOV assuming complete degradation. In this case, very often the MOV still has life remaining and the user spends unnecessary money to replace the MOV.

It is common for buildings to have many surge protectors, sometimes exceeding hundreds. These surge protectors provide a safeguard to a wide variety of sensitive electronics and data storage devices. Unfortunately, to effectively monitor the operational status of each surge protector, it is necessary to do spot inspections to verify that no warning indicators have been activated. Under most circumstances, this process is costly and extremely unlikely. Many users assume their electronics are infinitely safe from power surges simply because they utilize a surge protector, however many of these surge protectors are no longer effective and the user is simply not aware of their status.

U.S. Published Application No. 2007/0097584 discloses a surge protection device which includes a plurality of surge modules mounted onto a printed circuit board. Each module has a diagnostic circuit. Each module preferably includes four (4) parallel branches, each branch having a metal oxide varistor (MOV) and a thermal cut-off (TCO) device connected in series. The device also consists of various diagnostic devices such as a light emitting diode (LED) coupled to each of the surge protection modules. The opening of a TCO causes the LED to change color. The device also includes a peak detector circuit for processing information regarding a surge event, such as amplitude and time, which in turn may be stored in a memory unit. The published application also states that a microprocessor monitors the TCO's in the surge modules and causes warning messages to be displayed on an LCD screen when the surge protection has been degraded.

U.S. Published Application No. 2007/0086141 discloses a surge protection device which includes two MOVs and two MOV failure indicator circuits. Each circuit includes a fuse coupled to an LED. When the fuse opens, the LED indicates an MOV failure. The failure of the MOVs and subsequent lighting of the LEDs indicate the surge protector/strip requires replacement.

U.S. Published Application No. 2007/0002511 discloses a surge protection device which includes circuits utilizing gas discharge tubes (GDT) and MOVs. The invention also comprises a microcontroller or microprocessor for monitoring a plurality of voltages at certain points throughout the circuit. The microprocessor can determine whether or not the surge protectors are functioning or if there is a failure or malfunction. The user may be notified of failure via visual means such as a variable LED or audible tone. The power company or utility company also will be notified of the failure or malfunction by transmission means such as a low frequency signal sent over the power lines to a central unit. The surge protection module may be replaced and repaired.

U.S. Published Application No. 2003/0151874 discloses a surge protection device which utilizes MOVs and indicates their operational status via LEDs.

U.S. Published Application No. 2002/0141127 discloses a surge protection device which includes a housing which encloses a variety of different types of surge protector modules for communication systems, AC systems, and cables. Each surge protection module comprises a resistor, diode, light emitting diode and switch (including an MOV). The device includes LED warning lights to indicate surge module failure. The published application states that the surge protector modules may be easily removed and replaced from the main housing.

U.S. Pat. No. 6,881,076 discloses a device which is a coaxial module including removable surge protector modules. The entire surge protector modules are removable from the device via pins or screws connecting them to a printed circuit board.

U.S. Pat. No. 5,982,603 discloses a device which is a detachable surge protector module comprising two varistors and supportive circuitry. There is temperature sensitive tape that varies in color when surged with energy, thus providing a visual warning to the user when the surge protector has been degraded or destroyed. The entire device may be easily replaced without tools. The actual device includes a housing enclosing the varistors.

U.S. Pat. No. 5,053,919 discloses a surge protector module which may be removable from a main power assembly.

U.S. Pat. No. 5,010,438 discloses a device which is a detachable surge protector module for use in a circuit breaker box. The device includes MOVs coupled to fuses and LEDs to indicate the status of the suppressor module.

U.S. Pat. No. 4,907,118 discloses a device which is a plug in surge protector that is attached in line with the plug of a fixture and the electrical socket. It contains an MOV for providing surge protection along with an opening on its dorsal surface to view the MOV. When the MOV is surged, it changes color, indicating it is time to replace the device.

Most existing surge protectors or those having a replaceable MOV protection device are intended to tell the user when the device has failed, by using an audible alarm such as a small buzzer, or by a flashing LED, or by a special circuit arrangement to turn off the LED light when an MOV is burned out or damaged due to the surge energy which occurred on the AC power line.

The prior art, at best, either lets the user know of the current protective status of the MOV, or lets the user know that the MOV has failed. The obvious problem with the latter, just informing the user that the MOV has failed, is that while this condition exists, the equipment, supposedly protected by the MOV, is now unprotected and has the potential to be damaged by the next surge. The problem with the former is that the user just knows the current state of the MOV. When the user sees that the MOV has been degraded, the user will either replace the MOV immediately, or wait to replace it, hoping the next surge does not do any damage to the equipment connected to the surge protector.

SUMMARY OF THE INVENTION

The present invention provides a surge protector with removable MOVs and an apparatus and method for successfully monitoring the status of a plurality of surge protection devices.

The present invention and its particular circuit design with a programmable microprocessor IC, will continuously monitor the characteristics of the MOV (or MOVs) in the surge protector device and uses the real time measurement data of the MOV's condition to compare to the preset data of a good MOV when it is a new component with a 100% good working condition. The invention performs a real-time measurement of an MOV (or MOVs) that has been hit by multiple surge pulses in the power line during certain periods of time and the surge energy that passed through the MOV itself to ground (or line to neutral). Each surge causes a minuscule degradation in the MOV and its capability to absorb the surge energy. Power surges generally last less than 50 microseconds, but can reach as much as 6,000 volts and draw 3,000 amps when they arrive at the AC power line. An MOV acts like a pressure relief valve to divert the surge energy to the neutral and/or ground lines. The MOVs can eventually stop working without warning or burn out. By having the real-time measurement data of the MOVs, and comparing such data to the preset data of a good MOV, the present invention can predict when the MOV will fail or display the percentage of the MOV's life that is still existing or available to be used. This predictive approach alerts the user when it will be the right time to replace the MOV, before it fails. This will result in a more optimum solution for keeping the equipment protected by the MOV.

The present invention monitors the surge and/or MOV, and uses memory and a CPU to analyze the surges and degradation of the MOV over time. The result of the analysis is that the user can be given a prediction of when the MOV will fail (what percentage of useful protective life remains in the MOV). This is a far more optimum solution for the user. By having a monitoring system, either using the data which is collected over a period of time and stored in the memory chip, or a monitoring service through a contracted company such as the company who monitors the alarm system in consumers' homes or offices, with this invention, a consumer or user can schedule a replacement of the MOV, while minimizing the risk of having the user's equipment damaged because the MOV has failed. The contracted company can send a report card periodically, such as every 3 months or 6 months, to alert the consumer as to how many more viable months or days the MOV has before it will be exhausted or before the end of its protective life based upon the collected data which will show how frequently the surge pulses occur in the power line at that location or how quickly the characteristics of the MOV have been changed over a 3 or 6 month period.

The other advantage for the user is that the MOV need not be replaced earlier than needed, as the user has a more optimum prediction of how much "life" or time is remaining for the MOV.

In one form of the present invention, a home control protection system includes at least one surge protection strip having a plurality of power outlet receptacles and being electrically connectible to a source of power, the at least one surge protection strip having a housing, the plurality of power outlet receptacles being mounted on the housing, the housing defining an internal cavity; and an electronic circuit at least partially situated within the internal cavity of the housing. The electronic circuit provides surge protected power to each power outlet receptacle. A removable surge protector module is mounted on the housing and is electrically coupled to the electronic circuit. The surge protector module is removable from the housing and is electrically disconnectable from the electronic circuit by a user of the home control protection system, and is replaceable by the user with another surge protector module. The surge protector module has one or more surge protection devices which selectively change from a high impedance state to a low impedance state when the at least one surge protection strip receives a power surge at least equal to a predetermined magnitude from the source of power to which it is connectable.

The electronic circuit of the home control protection system includes means for counting the number of power surges at least equal to the predetermined magnitude received by the at least one surge protection strip and providing a counted number of power surges signal in response thereto; means for determining the rate of power surges at least equal to the predetermined magnitude received by the at least one surge protection strip in response to the counted number of power surges signal, and providing a rate of power surges signal in response thereto; means for storing a threshold maximum power surge number corresponding to a predicted maximum number of power surges before failure of the one or more surge protection devices of the surge protection module will occur; means for estimating the viability of the one or more surge protection devices of the surge protector module in response to at least the counted number of power surges signal and the threshold maximum power surge number, and providing a surge protection viability signal in response thereto; and means for determining a projected relative time when the one or more surge protection devices of the surge protector module will fail by being incapable of selectively changing from a high impedance state to a low impedance state in response to at least the counted number of power surges signal, the threshold maximum power surge number and the rate of power surges signal, and providing a projected failure time signal in response thereto.

The home control protection system further includes a central control unit in electrical communication with the at least one surge protection strip. The central control unit includes means for indicating to the user of the home control protection system an estimated viability of the one or more surge protection devices of the surge protector module of the at least one surge protection strip in response to the surge protection viability signal, and means for indicating to at least one of the user of the home control protection system and a third party to replace the surge protector module of the at least one surge protection strip in response to the projected failure time signal.

The one or more surge protection devices of the surge protector module of the at least one surge protection strip may include a metal oxide varistor. Preferably, the means for counting the number of power surges includes a microcontroller. The means for determining the rate of power surges may include a microcontroller. The means for storing a threshold maximum power surge number may include a memory. The means for estimating the viability of the one or more surge protection devices may include a microcontroller. Preferably, the means for determining a projected relative time when the one or more surge protection devices of the surge protector module will fail includes a microcontroller. The means for indicating to a user of the home control protection system an estimated viability of the one or more surge protection devices of the surge protector module may include a display. The means for indicating to at least one of the user of the home control protection system and a third party to replace to the surge protector module may include a display. The means for indicating to at least one of the user of the home control protection system and a third party to replace to the surge protector module may include an internet connection.

In the home control protection system, the means for estimating the viability of the one or more surge protection devices of the surge protector module may include a comparator which compares a counted number of power surges corresponding to the counted number of power surges signal and the threshold maximum power surge number. The comparator generates the surge protection viability signal in response to the comparison thereof. Furthermore, the means for indicating to a user of the home control protection system an estimated viability of the one or more surge protection devices of the surge protector module indicates to the user the viability of the one or more surge protection devices of the surge protector module as a percentage.

In another form of the present invention, a home control protection system includes at least one surge protection strip having a plurality of power outlet receptacles and being electrically connectible to a source of power. The at least one surge protection strip includes a housing, the plurality of power outlet receptacles being mounted on the housing, the housing defining an internal cavity, and an electronic circuit at least partially situated within the internal cavity of the housing, the electronic circuit providing surge protected power to each power outlet receptacle. Additionally, the at least one surge protection strip includes a removable surge protector module mounted on the housing and electrically coupled to the electronic circuit. The surge protector module is removable from the housing and is electrically disconnectable from the electronic circuit by a user of the home control protection system, and is replaceable by the user with another surge protector module. The surge protector module has one or more surge protection devices which selectively change from a high impedance state to a low impedance state when the at least one surge protection strip receives a power surge at least equal to a predetermined magnitude from the source of power to which it is connectable. Preferably, the electronic circuit includes means for estimating the viability of the one or more surge protection devices of the surge protector module, and providing a surge protection viability signal in response thereto.

In this form of the present invention, the home control protection system also includes a central control unit in electrical communication with the at least one surge protection strip. The central control unit preferably includes means for indicating to at least one of the user of the home control protection system and a third party to replace the surge protector module of the at least one surge protection strip in response to the surge protection viability signal.

Preferably, the means for estimating the viability of the one or more surge protection devices of the surge protector module includes means for measuring the impedance of the one or more surge protection devices of the surge protector module, and providing a measured impedance signal corresponding to the measured impedance of the one or more surge protection devices of the surge protector module; and means for comparing the measured impedance of the one or more surge protection devices of the surge protector module in response to the measured impedance signal and a known normal impedance value corresponding to the one or more protection devices of the surge protector module, and providing a comparator output signal indicative of the measured impedance being below the known normal impedance value, the surge protection viability signal being based in part on the comparator output signal.

In a more preferred form of the present invention described above, the means for measuring the impedance of the one or more surge protection devices of the surge protector module includes a voltage divider network. The voltage divider network has the one or more surge protection devices of the surge protector module connected in series with a known impedance. The voltage divider network provides a voltage divider signal to the electronic circuitry. Even more preferably, the means for measuring the impedance of the one or more surge protection devices of the surge protector module further includes means for selectively providing the voltage divider signal to the electronic circuitry. The means for selectively providing the voltage divider signal to the electronic circuit may include a timer circuit for periodically selectively providing the voltage divider signal to the electronic circuit.

Another form of the present invention is directed to a method of monitoring the surge protection afforded by a home control protection system. With respect to this method, the home control protection system has at least one surge protection strip having a plurality of power outlet receptacles and is electrically connectible to a source of power. The at least one surge protection strip includes a housing. The plurality of power outlet receptacles are mounted on the housing. The housing defines an internal cavity. The at least one surge protection strip further includes an electronic circuit at least partially situated within the internal cavity of the housing. The electronic circuit provides surge protected power to each power outlet receptacle. Furthermore, a preferably removable surge protector module is mounted on the housing and is electrically coupled to the electronic circuit. The surge protector module is removable from the housing and is electrically disconnectable from the electronic circuit by a user of the home control protection system, and is replaceable by the user with another surge protector module. The surge protector module has one or more surge protection devices which selectively change from a high impedance state to a low impedance state when the at least one surge protection strip receives a power surge at least equal to a predetermined magnitude from the source of power to which it is connectable. The home control protection system to which the method is directed further includes a central control unit in electrical communication with the at least one surge protection strip.

The method of monitoring the surge protection afforded by the home control protection system described above includes the steps of counting the number of power surges at least equal to the predetermined magnitude received by the at least one surge protection strip and providing a counted number of power surges signal in response thereto; determining the rate of power surges at least equal to the predetermined magnitude received by the at least one surge protection strip in response to the counted number of power surges signal, and providing a rate of power surges signal in response thereto; storing a threshold maximum power surge number corresponding to a predicted maximum number of power surges before failure of the one or more surge protection devices of the surge protection module will occur; estimating the viability of the one or more surge protection devices of the surge protector module in response to at least the counted number of power surges signal and the threshold maximum power surge number, and providing a surge protection viability signal in response thereto; determining a projected relative time when the one or more surge protection devices of the surge protector module will fail by being incapable of selectively changing from a high impedance state to a low impedance state in response to at least the counted number of power surges signal, the threshold maximum power surge number and the rate of power surges signal, and providing a projected failure time signal in response thereto; indicating to the user of the home control protection system an estimated viability of the one or more surge protection devices of the surge protector module of the at least one surge protection strip in response to the surge protection viability signal; and indicating to at least one of the user of the home control protection system and a third party to replace the surge protector module of the at least one surge protection strip in response to the projected failure time signal.

In a more preferred form of the present invention, the step of estimating the viability of the one or more surge protection devices of the surge protector module includes the step of comparing a counted number of power surges corresponding to the counted number of power surges signal and the threshold maximum power surge number, and generating the surge protection viability signal in response to the comparison thereof. Additionally, the step of indicating to a user of the home control protection system an estimated viability of the one or more surge protection devices of the surge protector module may include the step of indicating to the user the viability of the one or more surge protection devices of the surge protector module as a percentage.

Yet another form of the present invention is directed to a method of monitoring the surge protection afforded by a home control protection system, where the home control protection system has at least one surge protection strip having a plurality of power outlet receptacles and is electrically connectible to a source of power. The at least one surge protection strip includes a housing. The plurality of power outlet receptacles are mounted on the housing. The housing defines an internal cavity. The at least one surge protection strip further includes an electronic circuit that is at least partially situated within the internal cavity of the housing. The electronic circuit provides surge protected power to each power outlet receptacle. A removable surge protector module is mounted on the housing and electrically coupled to the electronic circuit. The surge protector module is removable from the housing and is electrically disconnectable from the electronic circuit by a user of the home control protection system, and is replaceable by the user with another surge protector module. The surge protector module has one or more surge protection devices which selectively change from a high impedance state to a low impedance state when the at least one surge protection strip receives a power surge at least equal to a predetermined magnitude from the source of power to which it is connectable. The home control protection system to which the method is directed further includes a central control unit in electrical communication with the at least one surge protection strip.

The method of monitoring the surge protection afforded by the home control protection system described above preferably includes the steps of estimating the viability of the one or more surge protection devices of the surge protector module, and providing a surge protection viability signal in response thereto; and indicating to at least one of the user of the home control protection system and a third party to replace the surge protector module of the at least one surge protection strip in response to the surge protection viability signal.

Even more preferably, the step of estimating the viability of the one or more surge protection devices of the surge protector module further includes the steps of measuring the impedance of the one or more surge protection devices of the surge protector module, and providing a measured impedance signal corresponding to the measured impedance of the one or more surge protection devices of the surge protector module; and comparing the measured impedance of the one or more surge protection devices of the surge protector module in response to the measured impedance signal and a known normal impedance value corresponding to the one or more protection devices of the surge protector module, and providing a comparison signal indicative of the measured impedance being below the known normal impedance value, the surge protection viability signal being based at least in part on the comparison signal.

Furthermore, the step of measuring the impedance of the one or more surge protection devices of the surge protector module may include the step of connecting the one or more surge protection devices of the surge protector module in series with a known impedance to generate a voltage divider signal, and may provide the voltage divider signal to the electronic circuitry. Even more preferably, the step of measuring the impedance of the one or more surge protection devices of the surge protector module further includes the step of selectively providing the voltage divider signal to the electronic circuitry, and even more preferably, the step of selectively providing the voltage divider signal to the electronic circuit may include the step of periodically selectively providing the voltage divider signal to the electronic circuit.

In another form of the present invention, a home control protection system includes at least one surge protection strip having a plurality of power outlet receptacles and being electrically connectible to a source of power. The at least one surge protection strip preferably has a housing. The plurality of power outlet receptacles are mounted on the housing and the housing defines an internal cavity.

Preferably, the at least one surge protection strip further includes an electronic circuit at least partially situated within the internal cavity of the housing, the electronic circuit providing surge protected power to each power outlet receptacle, and a removable surge protector module mounted on the housing and electrically coupled to the electronic circuit. The surge protector module is removable from the housing and is electrically disconnectable from the electronic circuit by a user of the home control protection system, and is replaceable by the user with another surge protector module. The surge protector module has one or more surge protection devices which selectively change from a high impedance state to a low impedance state when the at least one surge protection strip receives a power surge at least equal to a predetermined magnitude from the source of power to which it is connectable.

Preferably, the electronic circuit of the at least one surge protection strip of the home control protection system includes means for counting the number of power surges at least equal to the predetermined magnitude received by the at least one surge protection strip and providing a counted number of power surges signal in response thereto; means for determining the rate of power surges at least equal to the predetermined magnitude received by the at least one surge protection strip in response to the counted number of power surges signal, and providing a rate of power surges signal in response thereto; means for storing a threshold maximum power surge number corresponding to a predicted maximum number of power surges before failure of the one or more surge protection devices of the surge protection module will occur; means for estimating the viability of the one or more surge protection devices of the surge protector module in response to at least the counted number of power surges signal and the threshold maximum power surge number, and providing a surge protection viability signal in response thereto; means for determining a projected relative time when the one or more surge protection devices of the surge protector module will fail by being incapable of selectively changing from a high impedance state to a low impedance state in response to at least the counted number of power surges signal, the threshold maximum power surge number and the rate of power surges signal, and providing a projected failure time signal in response thereto; and means for monitoring the power consumed over a predetermined period of time by an electrical device connected to at least one power outlet receptacle of the plurality of power outlet receptacles of the at least one surge protection strip, and providing a power consumed signal in response thereto.

Furthermore, the home control protection system in this preferred form includes a central control unit in electrical communication with the at least one surge protection strip. Preferably, the central control unit includes means for indicating to the user of the home control protection system an estimated viability of the one or more surge protection devices of the surge protector module of the at least one surge protection strip in response to the surge protection viability signal; means for indicating to at least one of the user of the home control protection system and a third party to replace the surge protector module of the at least one surge protection strip in response to the projected failure time signal; and means for indicating to the user of the home control protection system the power consumed over the predetermined period of time by the electrical device connected to the at least one power outlet receptacle of the at least one surge protection strip in response to the power consumed signal.

In another form of the present invention, a home control protection system includes at least one surge protection strip having a plurality of power outlet receptacles and being electrically connectible to a source of power. The at least one surge protection strip preferably has a housing. The plurality of power outlet receptacles are mounted on the housing. The housing defines an internal cavity.

The at least one surge protection strip further includes an electronic circuit at least partially situated within the internal cavity of the housing. The electronic circuit provides surge protected power to each power outlet receptacle.

Furthermore, a removable surge protector module is preferably mounted on the housing and is electrically coupled to the electronic circuit. The surge protector module is removable from the housing and is electrically disconnectable from the electronic circuit by a user of the home control protection system, and is replaceable by the user with another surge protector module. The surge protector module has one or more surge protection devices which selectively change from a high impedance state to a low impedance state when the at least one surge protection strip receives a power surge at least equal to a predetermined magnitude from the source of power to which it is connectable.

The electronic circuit of the at least one surge protection strip of the home control protection system preferably includes means for estimating the viability of the one or more surge protection devices of the surge protector module, and providing a surge protection viability signal in response thereto; and means for monitoring the power consumed over a predetermined period of time by an electrical device connected to at least one power outlet receptacle of the plurality of power outlet receptacles of the at least one surge protection strip, and providing a power consumed signal in response thereto.

Furthermore, the home control protection system of the present invention, in this preferred form, includes a central control unit in electrical communication with the at least one surge protection strip. The central control unit preferably includes means for indicating to at least one of the user of the home control protection system and a third party to replace the surge protector module of the at least one surge protection strip in response to the surge protection viability signal; and means for indicating to the user of the home control protection system the power consumed over the predetermined period of time by the electrical device connected to the at least one power outlet receptacle of the at least one surge protection strip in response to the power consumed signal.

In another form of the present invention, the method of monitoring the surge protection afforded by a home control protection system such as described previously may further include the steps of monitoring the power consumed over a predetermined period of time by an electrical device connected to at least one power outlet receptacle of the plurality of power outlet receptacles of the at least one surge protection strip, and providing a power consumed signal in response thereto; and indicating to the user of the home control protection system the power consumed over the predetermined period of time by the electrical device connected to the at least one power outlet receptacle of the at least one surge protection strip in response to the power consumed signal.

In another form of the present invention, a home control protection system includes at least one surge protection strip having a plurality of power outlet receptacles and being electrically connectible to a source of power. The at least one surge protection strip preferably has a housing. The plurality of power outlet receptacles are mounted on the housing. The housing defines an internal cavity.

Preferably, the at least one surge protection strip includes an electronic circuit at least partially situated within the internal cavity of the housing. The electronic circuit provides surge protected power to each power outlet receptacle.

Furthermore, the at least one surge protection strip includes a removable surge protector module mounted on the housing and electrically coupled to the electronic circuit. The surge protector module is removable from the housing and is electrically disconnectable from the electronic circuit by a user of the home control protection system, and is replaceable by the user with another surge protector module. The surge protector module may have one or more surge protection devices which selectively change from a high impedance state to a low impedance state when the at least one surge protection strip receives a power surge at least equal to a predetermined magnitude from the source of power to which it is connectable.

The electronic circuit of the at least one surge protection strip preferably includes a microcontroller. The microcontroller counts the number of power surges at least equal to the predetermined magnitude received by the at least one surge protection strip and provides a counted number of power surges signal in response thereto. The microcontroller further determines the rate of power surges at least equal to the predetermined magnitude received by the at least one surge protection strip in response to the counted number of power surges signal, and provides a rate of power surges signal in response thereto.

Furthermore, the electronic circuit preferably includes a memory electrically coupled to the microcontroller. The memory stores a threshold maximum power surge number corresponding to a predicted maximum number of power surges before failure of the one or more surge protection devices of the surge protection module will occur. The microcontroller further estimates the viability of the one or more surge protection devices of the surge protector module in response to at least the counted number of power surges signal and the threshold maximum power surge number, and provides a surge protection viability signal in response thereto. The microcontroller further determines a projected relative time when the one or more surge protection devices of the surge protector module will fail by being incapable of selectively changing from a high impedance state to a low impedance state in response to at least the counted number of power surges signal, the threshold maximum power surge number and the rate of power surges signal, and provides a projected failure time signal in response thereto.

The home control protection system further preferably includes a central control unit in electrical communication with the at least one surge protection strip. The central control unit may also include a display. The display indicates to the user of the home control protection system an estimated viability of the one or more surge protection devices of the surge protector module of the at least one surge protection strip in response to the surge protection viability signal. The display further indicates to at least one of the user of the home control protection system and a third party to replace the surge protector module of the at least one surge protection strip in response to the projected failure time signal.

In another form of the present invention, a home control protection system includes at least one surge protection strip having a plurality of power outlet receptacles and being electrically connectible to a source of power. Preferably, the at least one surge protection strip has a housing. The plurality of power outlet receptacles is mounted on the housing. The housing defines an internal cavity.

The at least one surge protection strip further includes an electronic circuit at least partially situated within the internal cavity of the housing. The electronic circuit provides surge protected power to each power outlet receptacle.

The at least one surge protection strip further preferably includes a removable surge protector module mounted on the housing and electrically coupled to the electronic circuit. The surge protector module is removable from the housing and is electrically disconnectable from the electronic circuit by a user of the home control protection system, and is replaceable by the user with another surge protector module. The surge protector module may have one or more surge protection devices which selectively change from a high impedance state to a low impedance state when the at least one surge protection strip receives a power surge at least equal to a predetermined magnitude from the source of power to which it is connectable.

The electronic circuit of the at least one surge protection strip preferably includes a microcontroller. The microcontroller estimates the viability of the one or more surge protection devices of the surge protector module, and provides a surge protection viability signal in response thereto.

The home control protection system described above further preferably includes a central control unit in electrical communication with the at least one surge protection strip. The central control unit may include a display. The display indicates to at least one of the user of the home control protection system and a third party to replace the surge protector module of the at least one surge protection strip in response to the surge protection viability signal.

In a more preferred form of the present invention, the means for monitoring the power consumed over a predetermined period of time by an electrical device connected to at least one power outlet receptacle of the plurality of power outlet receptacles of the at least one surge protection strip includes a current sensor. The current sensor is electrically connected to the at least one power outlet receptacle of the plurality of power outlet receptacles and senses the magnitude of the current provided to the at least one power outlet receptacle.

In another form of the present invention, the electronic circuit of the at least one surge protection strip further includes a transceiver for transmitting signals to and receiving signals from the central control unit. Furthermore, the central control unit includes a transceiver for transmitting signals to and receiving signals from the at least one surge protection strip.

Furthermore, the home control protection system may include means for selectively controlling the power provided to at least one power outlet receptacle of the plurality of power outlet receptacles of the at least one surge protection strip. The means for selectively controlling the power provided to at least one power outlet receptacle of the plurality of power outlet receptacles of the at least one surge protection strip may include a switching circuit. The switching circuit is selectively switchable between a first state in which the surge protection strip provides power to the at least one power outlet receptacle, and a second state in which the surge protection strip provides no power to the at least one power outlet receptacle. The switching circuit is selectively switchable between the first and second states in response to a signal transmitted by the transceiver of the central control unit and received by the transceiver of the at least one surge protection strip.

In another form of the present invention, the method of monitoring the surge protection afforded by a home control protection system such as described previously may further include the steps of transmitting signals by the at least one surge protection strip to the central control unit, receiving signals by the at least one surge protection strip from the central control unit, transmitting signals by the central control unit to the at least one surge protection strip, and receiving signals by the central control unit from the at least one surge protection strip. Furthermore, the method may include the additional step of selectively controlling the power provided to at least one power outlet receptacle of the plurality of power outlet receptacles of the at least one surge protection strip. The step of selectively controlling the power provided to at least one power outlet receptacle of the plurality of power outlet receptacles of the at least one surge protection strip may include the step of selectively switching a switchable portion of the electronic circuit of the at least one surge protection circuit between a first state in which the surge protection strip provides power to the at least one power outlet receptacle, and a second state in which the surge protection strip provides no power to the at least one power outlet receptacle, the switchable portion of the electronic circuit being selectively switchable between the first and second states in response to a signal transmitted by the central control unit and received by the at least one surge protection strip.

These and other objects, features and advantages of the present invention will be apparent from the following detailed description of illustrative embodiments thereof, which is to be read in connection with the accompanying drawings.

BRIEF DESCRIPTION OF THE DRAWINGS

FIG. 1A is a top view of a surge protection strip forming part of the home control protection system of the present invention.

FIG. 1B-1E are top views of replaceable MOV modules forming part of the home control protection system of the present invention.

DETAILED DESCRIPTION OF THE PREFERRED EMBODIMENTS

Figure 2:
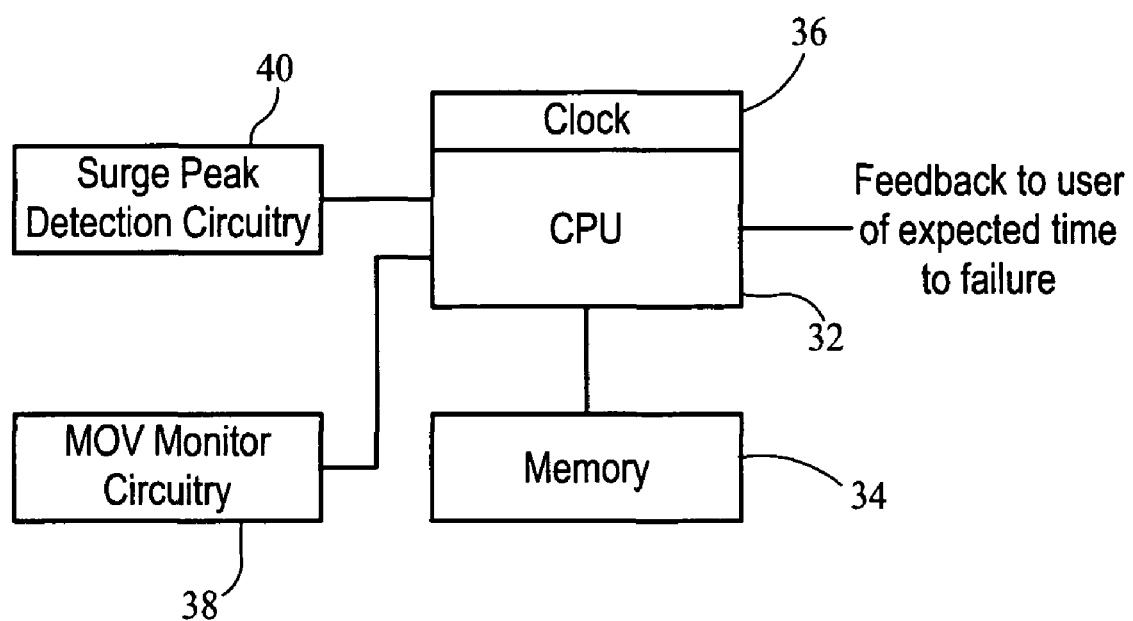
FIG. 2 is a block diagram of a circuit forming part of the home control protection system of the present invention for predicting the failure date of an MOV situated in one of the surge protection strips.

Initially referencing FIGS. 1A-1E of the drawings, in its most basic form, the present invention includes one or more power surge strips 2 having a plurality of outlet receptacles 4 for receiving the power cords of external electronic equipment such as televisions, computers, stereos, compact disk players and microwaves. The surge strip 2 itself may be connected to a conventional AC outlet by a three prong cord 6 extending from its main housing 8.

As can be seen from FIG. 1A of the drawings, the preferred form of the surge strip 2 forming part of the home control protection system of the present invention includes a housing 8 having an exposed top surface 10 on which are mounted a plurality of outlet receptacles 4, for example, the seven outlet receptacles 4 that are shown in FIG. 1A. Also mounted on the surface and removable therefrom is a replaceable module 12 containing one or more metal oxide varistors (MOVs). The MOV module 12 may be removed from the surge strip 2, and replaced with a module affording the same surge protection or a different surge protection. As shown in FIGS. 1B-1E, a series of interchangeable modules 12a-12d having different protection ratings (e.g., 2,400 J, 3,000 J, 4800 J, and 6000 J, the letter "3" referring to "joules") may be placed by the user into an opening 14 formed in the exposed top surface 10 of the housing 8 of the surge strip 2. Two diametrically opposed prongs 16 extending in opposite radially outwardly directions from the MOV module housing are received by two oppositely disposed notches 18 formed in the perimeter of the opening 14 for receiving the MOV module 12. In one form of the invention, the MOV module 12 may be turned in either a clockwise or counterclockwise direction a predetermined number of degrees (for example, 45 degrees) in order to misalign the projections 16 on the MOV module 12 with the receiving notches 18 in the exposed top surface 10 of the surge strip housing 8 in order to lock the MOV module 12 in place and to ensure there is an electrical connection between the contacts 16 of the MOV module 12 and the protection circuit situated within the interior cavity defined by the surge strip housing 8. Alignment markings 20, 22 may be provided on both the replaceable MOV module 12 and the exposed top surface 10 of the surge strip housing 8 to indicate for the user whether the MOV module 12 has been properly and rotatably positioned in place on the surge strip 2.

As can also be seen from FIG. 1A of the drawings, the exposed top surface 10 of the surge strip 2 which is viewable by the user may include two visual indicators 24, 26, such as light emitting diodes (LEDs), for advising the user that it may soon be necessary to replace the MOV in the surge strip 2 (see the "Replace Soon" marking above a first light indicator 24) or that the surge strip has failed (see the marking "System Failure" above a second light indicator 26). One or the other LED 24, 26 will illuminate when the corresponding previously described condition has occurred.

In one form of the present invention, each surge strip 2 may further include an audible alarm 28, as shown in FIG. 1A of the drawings. The alarm 28 may be a transducer (not shown) situated below and in alignment with one or more openings, such as a series of slots 30 formed through the thickness of the exposed surface 10 of the surge strip housing 8, with the nomenclature "MOV Failure Alarm" shown in proximity to the transducer opening 30. The transducer, connected to the internal circuitry of the surge strip 2, may emit an intermittent or continuous audible signal to indicate to the user that the MOV has failed.

Further features of the surge strip 2 of the home control protection system of the present invention will be described in greater detail.

FIG. 2 illustrates in block diagram form a circuit of the home control protection system of the present invention which predicts the failure date of an MOV of each of the surge strips 2 of the protection system. Basically, the circuit includes a Central Processing Unit (CPU) 32, a memory 34, which includes either a Random Access Memory (RAM) or a Read Only Memory (ROM), or both, a clock circuit 36 driving the CPU 32, an MOV monitor circuit 38 connected to the CPU 32, and a surge peak detection circuit 40 also connected to the CPU 32. Some or all of the components of the circuit are either housed in each of the surge strips 2 of the home control protection system of the present invention, or are situated in a central unit 42 (see FIGS. 4A-4C), such as a wall mountable panel 44 having a liquid crystal display (LCD) 46, which communicates with each of the plurality of surge strips 2 of the home control protection system.

Again, referring to FIG. 2 of the drawings, the CPU 32 is programmed with the MOV ratings and monitors the MOV and the surges which occur on a particular surge strip 2. The surges are "time stamped" and recorded by the CPU 32, and this information is stored in the memory 34. The MOVs characteristic impedance and/or capacitance will reflect its capability to absorb (or divert to ground or another line with a different potential) the surge energy.

Various algorithms can be applied to the data to estimate when the MOV will fail. For example, in a simple form of an algorithm contemplated to be used in the present invention, the MOV has a characteristic impedance/capacitance of X units when it is a new (unused) component, with a 100% working condition, and after 30 days of operation, for example, the CPU 32 has recorded multiple surges absorbed by the MOV and again measures the characteristic impedance/capacitance of the MOV as being Y units. For this example, using a simple calculation, the CPU 32 will determine and indicate to the user that the expected life of the MOV is Z percent of its original life expectancy.

Other more sophisticated algorithms are envisioned to be used in the home control protection system of the present invention to predict the remaining life of the MOV, such as a "least means square" algorithm, curve fitting, and the like. With the surges being "time stamped" and recorded by the CPU 32, the CPU can predict how many days the MOV has remaining before it is expected to fail.

This information, fed back to the user, of the expected life remaining for the MOV could be provided continuously on a display panel 44 of the central control unit 42 or on the surge strip 2 itself. This information could also be provided to a remote location where a monitoring service or a "collector" of such information is located, who would then notify the user that the MOV is predicted to fail at a predetermined date and such MOV should be replaced. The communication between the home control protection system and the remote monitoring service may be by e-mail, telephone or radio frequency (RF) communication.

The CPU program may also implement a second algorithm which would be based on the MOV rating and the rate of MOV degradation. This algorithm would be used to determine when to alert the user with an explicit recommendation as to when the MOV module 12 should be replaced. For example, it may be that the CPU 32 is programmed to provide an indication to the user to replace the MOV module 12 one month before the predicted failure date.

The removable MOV (or more precisely, MOV module 12) is preferably electrically connected across the hot and neutral lines of the AC (alternating current) power line provided to the surge strip 2. Possible values for the removable MOV 12 would be 2400 J (joules), 3600 J, 4800 J and 6000 J, for example. One or more other MOVs 48 (see FIG. 18) may be electrically connected between the neutral and ground lines. These may be a fixed value, for example, 1200 J, and such MOVs 48 may not be replaceable. The MOVs used would most likely be a multiple of 300 J, with several 300 J MOVs electrically connected in parallel to arrive at the desired MOV rating. For example, four equal value 300 J MOVs may be connected in parallel to provide a 1200 J protection rating, that is, four times the rating of each individual MOV.

Again referring to FIG. 1A of the drawings, preferably, the warning indicators 24, 26 are two red lights, one for providing the user with a warning that the MOV module 12 will need to be replaced soon, and the other for indicating a system failure. The system failure could mean the MOV 48 between neutral and ground has failed, or there may be some internal circuit failure. The MOV failure alarm 28 (i.e., the audible alarm) audibly warns the user that the MOV has failed and that the equipment connected to the surge strip 2 may be at risk.

Figure 3:
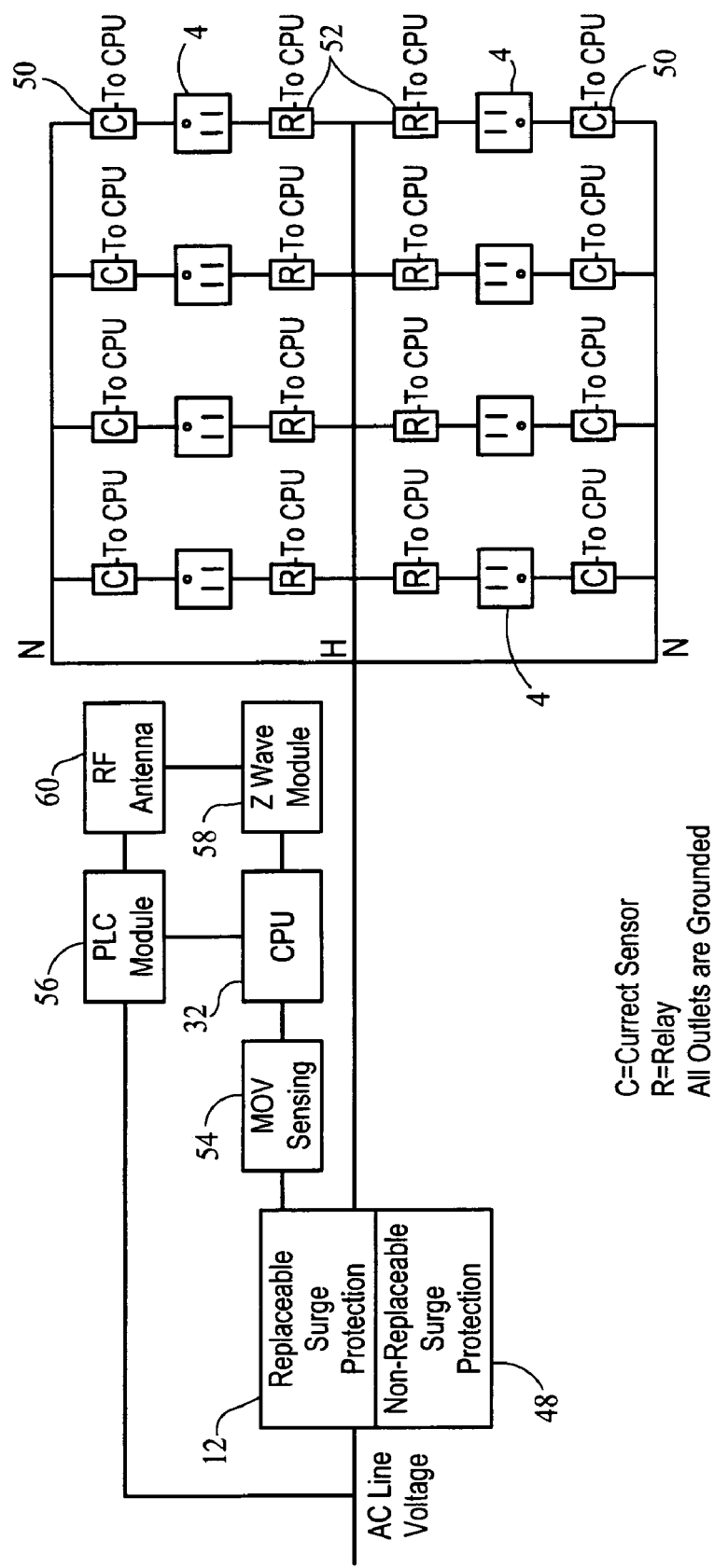
FIG. 3 is a block diagram of various components of the circuit of a surge protection strip forming part of the home control protection system of the present invention.

FIG. 3 illustrates a block diagram of one form of the circuit used in one of the surge strips 2 of the home control protection system of the present invention. As can be seen from FIG. 3, the outlet receptacles 4 of the surge strip (here, in FIG. 3, there are eight receptacles 4 illustrated) are connected to the Neutral ("N") and Hot ("H") lines as well as to ground (not shown). In series with the Neutral ("N") line to each outlet receptacle 4 is situated a current sensor ("C") 50, and connected in series with each Hot ("H") line to each outlet receptacle 4 is a relay ("R") 52, although it is envisioned to be within the scope of the present invention to reverse the location of the current sensor 50 and the relay 52. Each current sensor 50 measures the current drawn by the electrical device connected to the corresponding outlet receptacle 4 of the surge strip 2, and provides a signal indicative of the current drawn by the equipment to a central processing unit (CPU) 32 preferably situated in the corresponding surge strip 2. Each relay 52 connected to a corresponding outlet receptacle 4 of the surge strip 2 is also connected to the CPU 32, which provides a control signal to the relay 52 to selectively interrupt, on command from the CPU, power to and energization of the corresponding outlet receptacle 4, for example, in the event of it being necessary to protect electrical equipment connected thereto or to disable a particular outlet receptacle from being used, but more preferably, to effect a timer function on each outlet receptacle 4 of the surge strip 2, as will be described in greater detail.

As can be seen in FIG. 3 of the drawings, the AC line voltage must pass through the replaceable MOV module 12 ("Replaceable Surge Protection") and the non-replaceable MOV 48 ("Non-Replaceable Surge Protection"). The replaceable MOV (or more precisely, the MOV module 12) is electrically coupled to an MOV sensing circuit 54, for sensing one or both of the resistance/capacitance of the MOV module 12 and power surges absorbed by the MOV module, which information is used in predicting the remaining life of the MOV module 12. The MOV sensing circuit 54 is coupled to the CPU 32 and provides signals to the CPU indicative of the resistance/capacitance of the replaceable MOV 12 and the characteristics of any power surges absorbed by the MOV 12. Thus, the MOV sensing circuit 54 may be used to detect when a surge occurs and preferably other characteristics of the surge (for example, time duration and the peak voltage of the surge), and provides a signal indicative of this information to the CPU 32, which time stamps the surge and records other information about the surge used in predicting the life expectancy and date of failure of the replaceable MOV module 12.

The surge strip 2 may also include a PLC (power line communication) module 56 which is connected to the AC line voltage and the CPU 32. The PLC module 56 is used when the surge strip 2 communicates with the central unit 40 of the home control protection system over the house or office electrical power line wiring, as will be described below.

In one form of the present invention, the calculations pertaining to the life expectancy of the MOV 12 performed by the CPU 32 may be transmitted to a central monitoring station (e.g., the wall mountable panel 42) of the home or office either wirelessly through an RF signal or over the power lines of the home or office. As shown in FIG. 3 of the drawings, a Zwave or Zigbee module 58 is connected to the CPU 32, and receives signals with such pertinent information and generates an RF signal carrying this information, which RF signal is provided to an RF antenna 60 to be transmitted to the central monitoring station 42 in the home or office. Either the PLC module 56 or the Zwave or Zigbee module 58 may be used to receive programming commands and other information directly from the wall mountable central unit 42 of the home control protection system, or indirectly from a personal computer 62 (see FIG. 6) connected to the system, or to transmit pertinent information directly to the control unit 42 or indirectly to the personal computer 62, as will be described in greater detail in connection with the system of the present invention illustrated by FIG. 6.

Figure 4A:
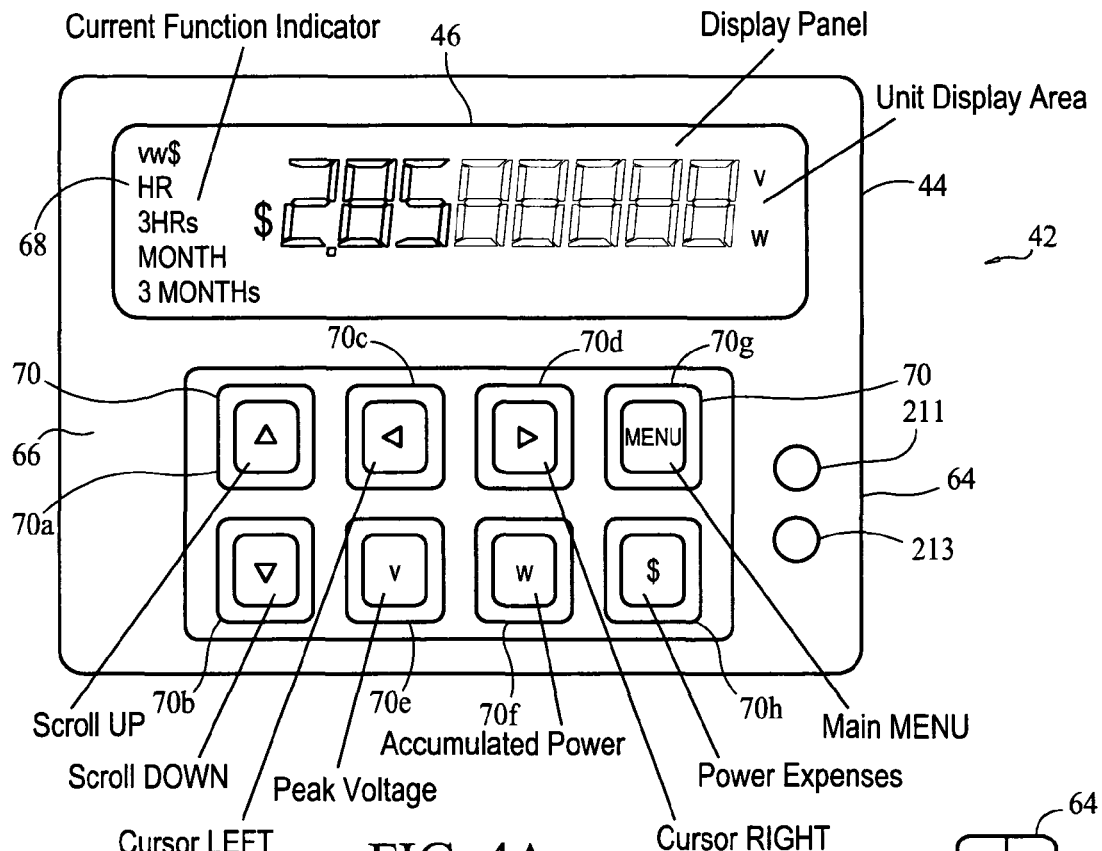
FIG. 4A is a front view of a wall mountable central unit forming part of the home control protection system of the present invention.
Figure 4B:
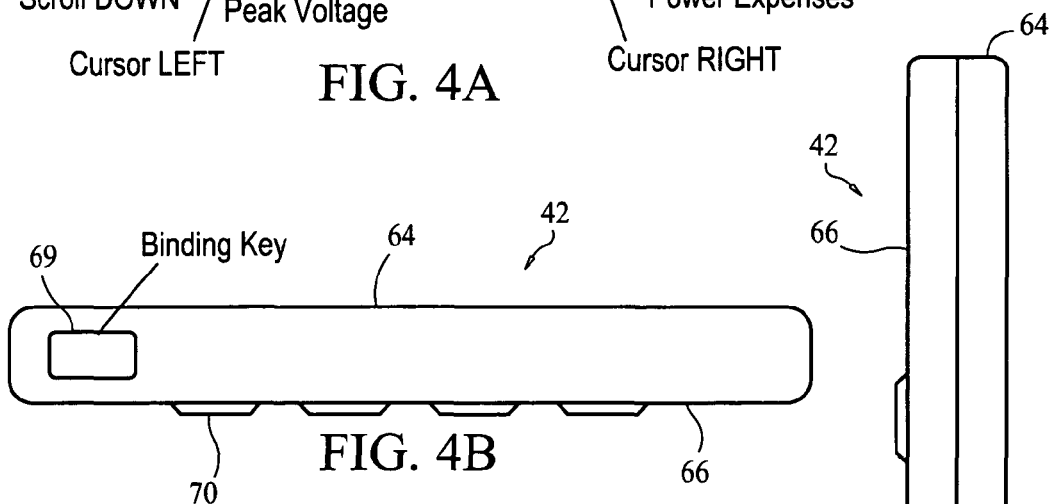
FIG. 4B is a top view of a wall mountable central unit forming part of the home control protection system of the present invention.
Figure 4C:
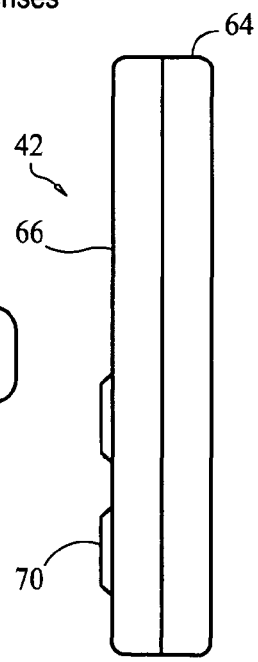
FIG. 4C is a side view of a wall mountable central unit forming part of the home control protection system of the present invention.

FIGS. 4A-4C illustrate one form of a wall mountable unit 44 which acts as a central monitoring and control station 42 of the home control protection system of the present invention, and which communicates with each of the plurality of surge protection strips 2 distributed throughout the house or office. Preferably, the wall mountable central unit 42 includes a housing 64 having an exposed surface 66 on which is mounted a display 46, such as a liquid crystal display (LCD). One portion 68 of the display 46 acts as a function indicator, to advise the user what function is being performed and displayed by the wall mountable central unit 42. As shown in FIG. 4B, there is a binding key 69 disposed on the side wall of the housing of the central unit 42. This binding key 69 is pressed when the user is pairing the surge strip 2 to the central unit 42.

The unit 44 further includes a plurality of user operable keys 70 (for example, momentary push button switches) for the user to press to program the central unit 44 to perform a particular function or display certain information. For example, such keys 70 may include a "Scroll Up" key 70a, a "Scroll Down" key 70b, a "Cursor Left" key 70c, a "Cursor Right" key 70d, a "Peak Voltage" key 70e, an "Accumulated Power" key 70f, a "Main Menu" key 70g and a "Power Expenses" key 70h. Of course, the present invention is not to be construed as being limited to the particular keys 70 described above, and the central unit 44 may include other user operable keys 70, and perform other functions, than those which are described above for illustrative purposes only.

Figure 5:
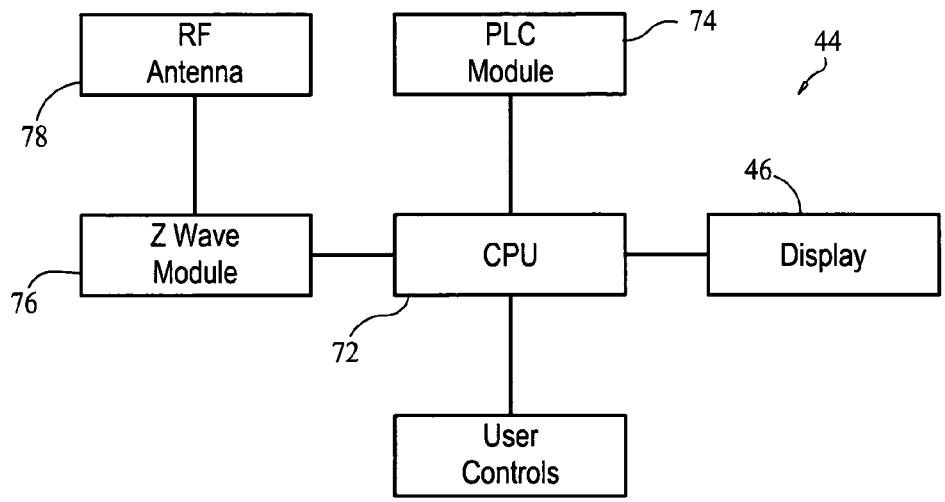
FIG. 5 is a block diagram of the circuit of the central unit of the home control protection system of the present invention.

A block diagram of the circuit of the wall mountable central unit 44 of the home control protection system of the present invention is illustrated by FIG. 5 of the drawings. The central unit 44 includes a CPU 72, and the display 46 as described previously, which is connected to the CPU 72 and receives signals from the CPU and provides user readable characters on the display 46 in response to the CPU signals. A PLC (power line communication) module 74 may also be included in the central unit 42 and is connected to the CPU 72 so that the central unit may communicate over the power lines with one or more surge protection power strips 2 distributed throughout the home or office. Alternatively, a Zwave or Zigbee module 76 may be connected to the CPU 72 for wireless communications with the various surge strips 2 forming part of the home control protection system. The Zwave module 76 receives signals from the CPU 72 and transmits a modulated RF signal through an RF antenna 78 connected thereto to the various surge strips 2 distributed throughout the home or office.

Figure 6:
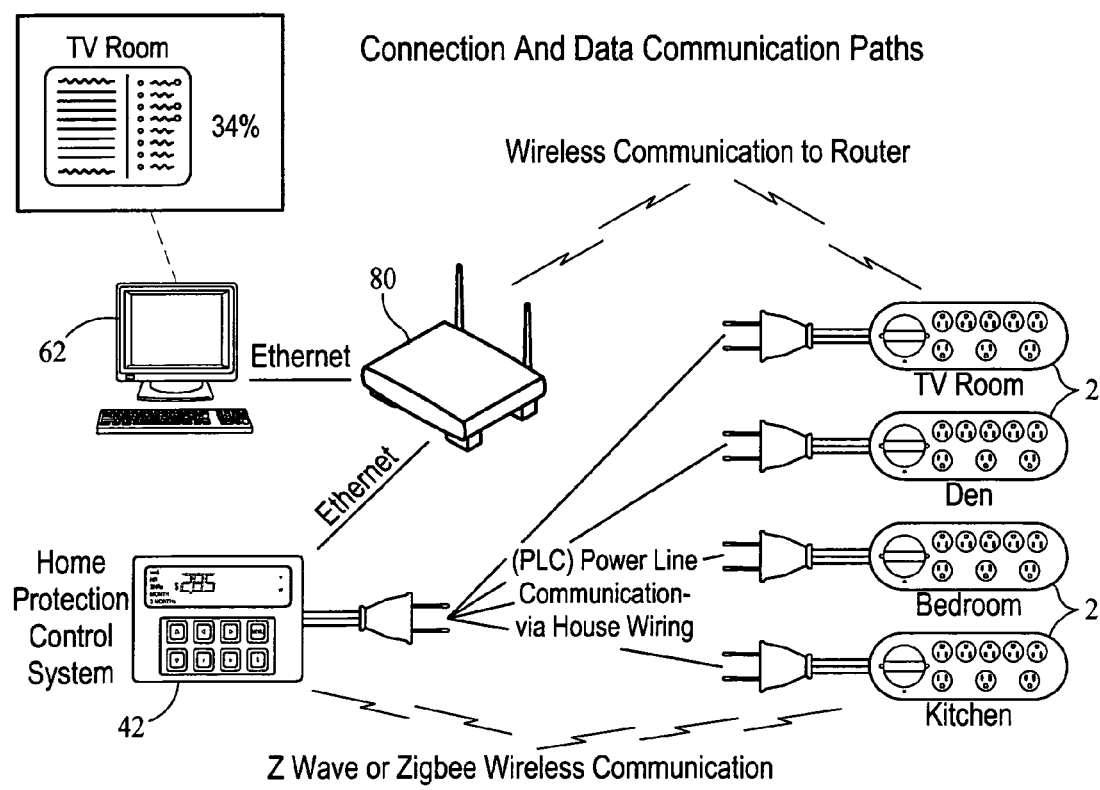
FIG. 6 is an illustration of the home control protection system, and the various connection and data communication paths used by the system.

FIG. 6 illustrates the connection and data communication paths between the various surge strips 2 distributed throughout the home or office and the central unit 42, such as the wall mountable panel 44 shown in FIG. 4. The removable MOV surge strips 2 may communicate with a personal computer 62 or directly to the central unit 42 of the home control protection system. Communication may be through the house wiring using the PLC modules 56, 74, as described previously. The exchange of information and commands may also be carried out wirelessly, through RF (radio frequency) communications, to a wireless access point or router 80, as shown in FIG. 6. The wireless access point may be built into the home protection control system of the present invention. Alternatively, data may be sent wirelessly using other protocols, like Zigbee communications or Zwave communications, as described previously, or even by using custom protocols.

The computer 62 communicating with the home control protection system of the present invention, or the home control protection system itself, may have a connection through a communication path to a remote location outside the home or office. This communication path may be to a proprietary computer that remotely monitors the home or office's power usage, MOV life and other important parameters. A remote central monitoring station (outside the home or office) may be used to notify the user of the home protection control system of the present invention when MOVs 12 are needed to be replaced. The proprietary computer could be hosted at a power company or a home security company, for example.

As shown in FIG. 6, the various surge strips 2 may be situated in different parts of the home or office, for example, the television room, the den, the bedroom and the kitchen. Each surge strip 2 can communicate wirelessly to a router 80 using a Zwave or Zigbee protocol, for example, directly to the central unit 42 of the home protection control system, or over the house or office electrical power wiring using power line communications to the central unit 42 of the home protection control system. When wirelessly communicating to a router

80, the router will be connected to a personal computer (PC) 62 and to the central unit 42 of the home protection control system through an Ethernet connection.

Figure 7:
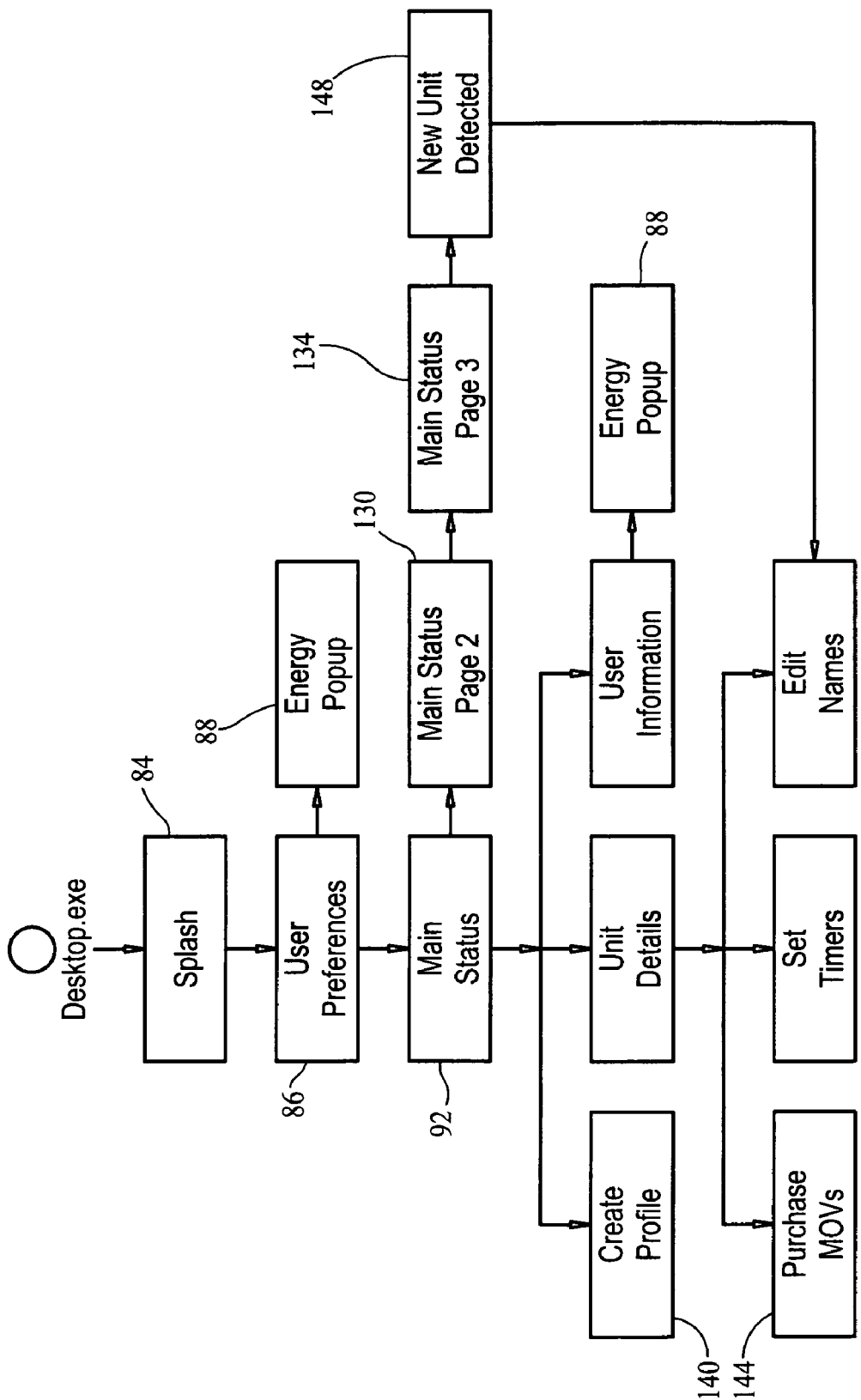
FIG. 7 is a flow chart of the operation and programming of the home control protection system.

FIG. 7 is a flow chart illustrating a user interface program for a personal computer (PC) 62 for programming and interfacing with the home protection control system of the present invention. Furthermore, FIGS. 8-15 are illustrative examples of various screen displays which are viewable by the user on the personal computer 62.

It is clear from FIGS. 7-15 that one of the advantages of the home control protection system of the present invention is the ability to monitor the power usage of any electrical equipment or appliance connected to one of the surge strips 2 of the protection system, and such information may be selectively displayed by the user on either the personal computer 62 or the wall mountable central unit 42 of the home control protection system.

Figure 8:
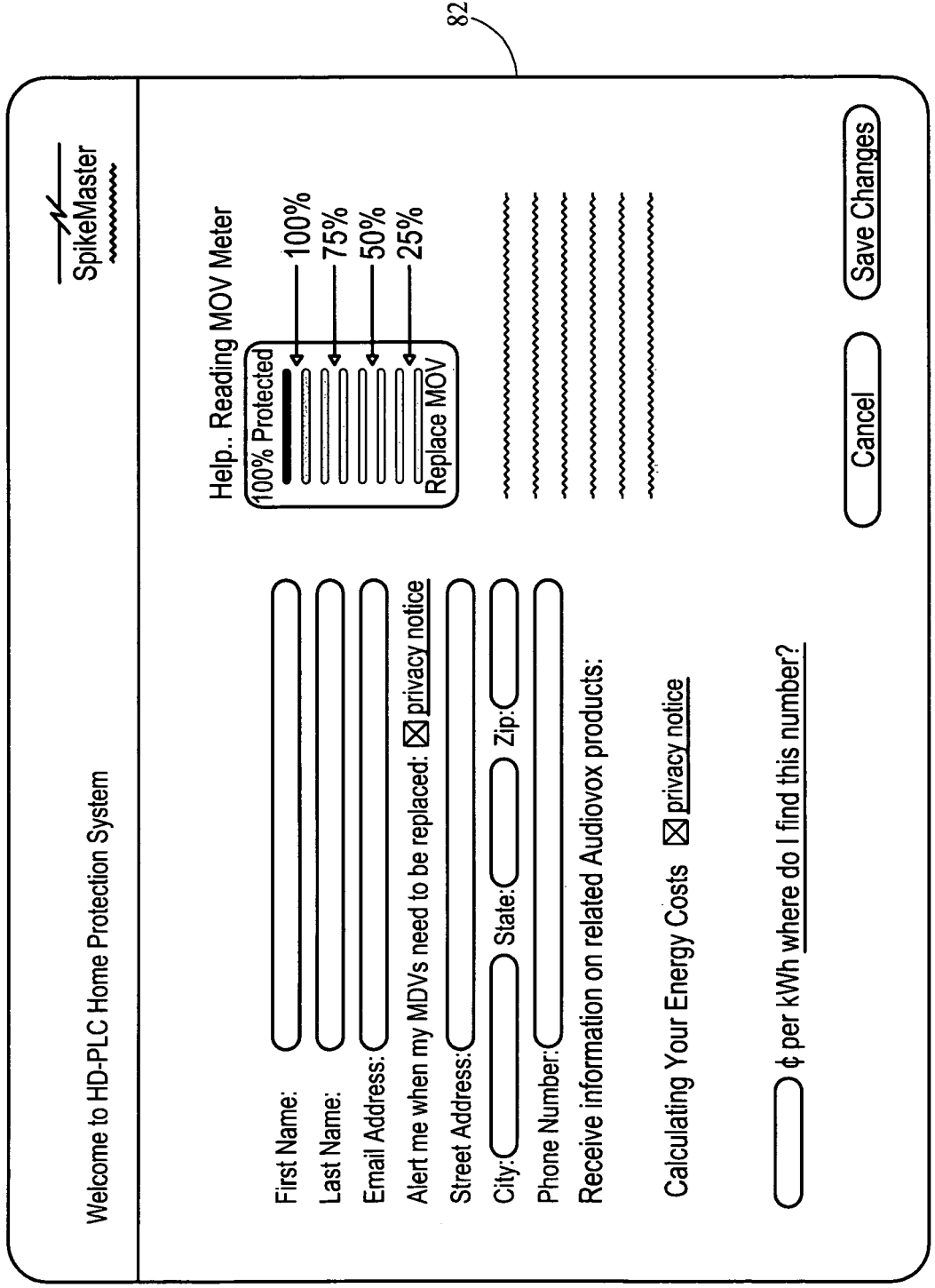
FIG. 8 is an illustrative view of a monitor screen display which is displayed by the home control protection system of the present invention.

More specifically, and as can be seen from FIG. 8 of the drawings, a user preferences menu 82 may be displayed on the PC 62 to allow the user to program the home control protection system of the present invention. The user enters pertinent information (e.g., his name, e-mail address, home address, telephone number, etc.), so that a remote monitoring station, if such is provided, may communicate with the user to advise the user when an MOV module 12 must be replaced or so that the user may purchase replacement MOVs 12 from a customer service contractor.

Also, as can be seen from FIG. 8 of the drawings, under the heading "Calculating Your Energy Costs", the user is prompted to enter information about his electric utility's charges for electrical power (i.e., cost per kilowatt hour). With this information, the home control protection system of the present invention may convert the calculated power consumption monitored by the system to more understandable, user-friendly information (e.g., a dollar amount) indicative of the power consumption of electrical equipment and appliances connected through the surge strips 2 of the home control protection system of the present invention. FIG. 8 relates to the blocks in the flow chart entitled "splash", "user preferences" and "energy popup" 84, 86, 88, respectively, shown in the block diagram of FIG. 7.

Figure 10:
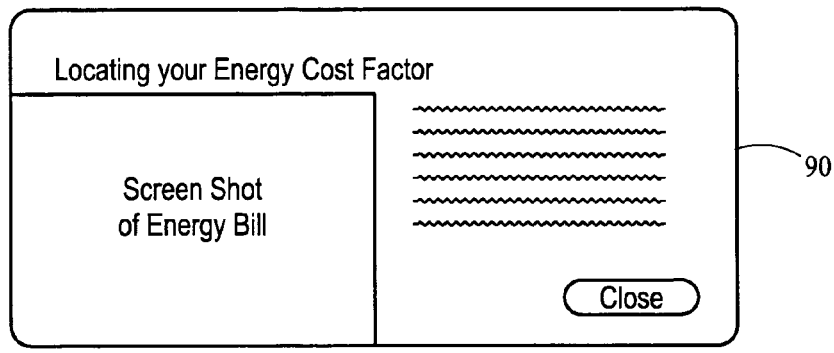
FIG. 10 is an illustrative view of a monitor screen display which is displayed by the home control protection system of the present invention.

If the user has trouble determining what his energy cost factor is, the home control protection system of the present invention will cause the PC 62 to display, at the user's request, a screen shot 90 of a typical energy bill, as shown in FIG. 10, so that the user may know what to look for in order to enter the pertinent information in the appropriate field displayed on the personal computer 62, as shown in FIG. 8.

Figure 9:
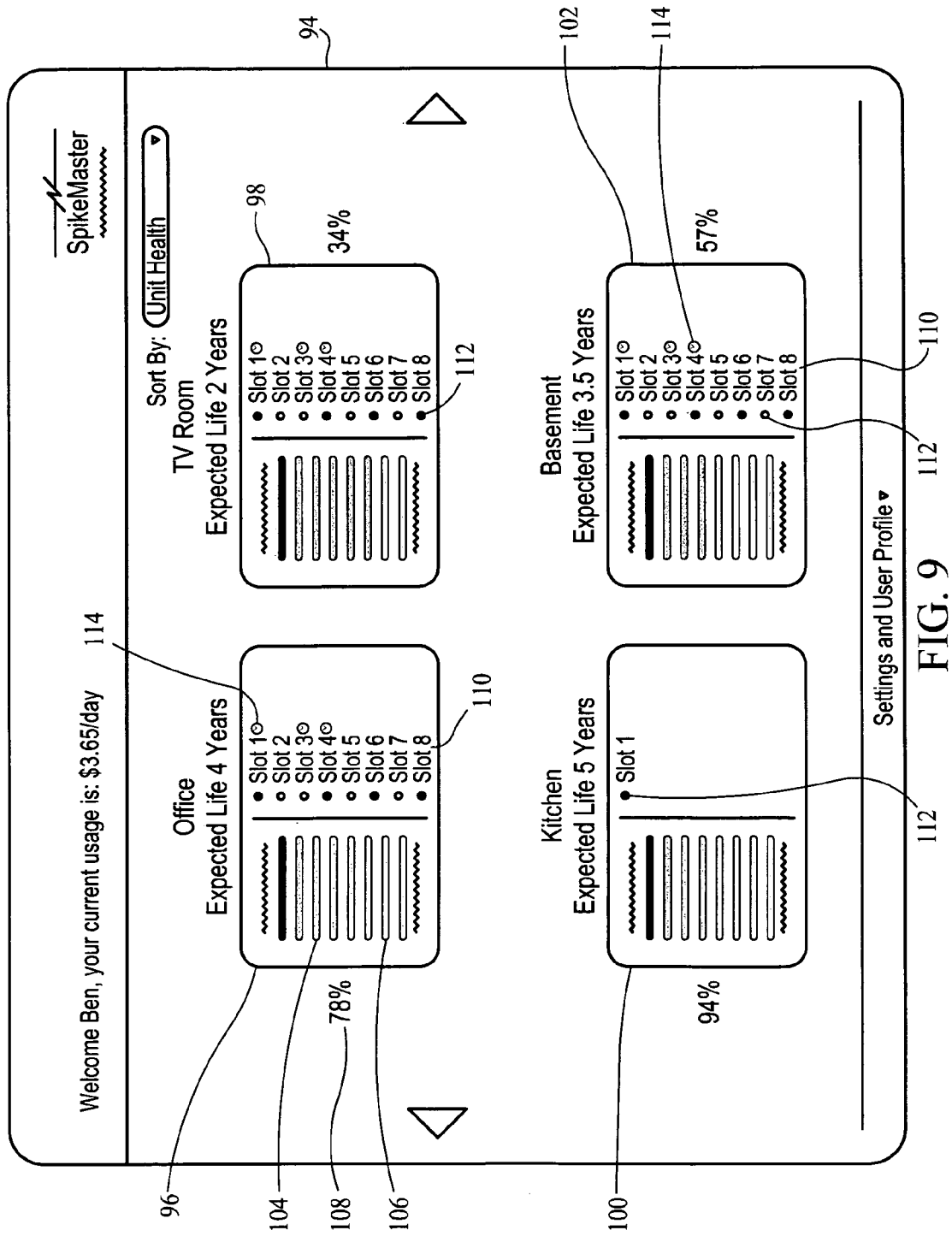
FIG. 9 is an illustrative view of a monitor screen display which is displayed by the home control protection system of the present invention.

A "Main Status" (see "Main Status" block 92 in FIG. 7) screen display 94 is now shown on the personal computer 62, as shown in FIG. 9. This display 94 shows multiple rooms at a glance. The display shows both the expected remaining life of the MOV 12 of each surge strip 2 distributed throughout the home or office, as well as how much protection is left as a percentage of the original MOV protection value.

For example, as shown in FIG. 9, there are four sub-displays 96, 98, 100, 102 shown on the personal computer 62, that is, "Office", "TV Room", "Kitchen" and "Basement". These room locations are for illustrative purposes only and should not be construed as limiting the invention in any manner, as the surge strips 2 may be placed in any room or location of the home or office. The identification of where the surge strip 2 is located is entered by the user on the PC 62 when he programs the home control protection system of the present invention. Accordingly, each surge strip 2 of a particular room, identified by the location (for example, "office"), or by some other identification which is useful for the user to identify the surge strip information which is being displayed, provides information about the power consumption of the electrical equipment or appliances connected to the surge strip 2, the percentage of life remaining of the MOV 12 for that particular surge strip 2 and the life expectancy, timewise, of the MOV 12 for that particular surge strip 2 to the central unit 42 of the home control protection system or the personal computer, on which the information is displayed. For example, for the surge strip 2 of the system located in the "office", a bar graph 104 is displayed having a plurality of vertically stacked segments 106 which may be individually illuminated for the user to quickly comprehend the percentage life remaining of the MOV 12 of that particular surge strip 2. The display 94 may also provide a numerical indication 108 (e.g., "78%") of the life remaining of the MOV 12 for a particular surge strip 2.

Also displayed on the personal computer 62, or for that matter on the display 46 of the wall mountable central unit 42 of the home control protection system, is a listing 110 of the outlet receptacles 4 ("Slot 1" . . . "Slot 8") of each particular surge strip. An indicator 112 next to each identifying indicia of the outlet receptacle 4 provides an indication as to whether current is being drawn by electrical equipment connected to that particular outlet receptacle 4. The current sensors 50 provided in each surge strip 2 (see FIG. 3) sense whether the electrical equipment connected to a respective outlet receptacle 4 is on or off (i.e., drawing current). A clock icon 114 may be displayed adjacent to and in alignment with one or more outlet receptacle identifying indicia (e.g., "Slot 3") to indicate whether a timing circuit within the CPU 32 is enabled to control the energization or de-energization of electrical equipment connected to a particular outlet receptacle 4. The function of the timer circuit will be described in greater detail.

It should be noted that in FIG. 9, the overall current usage of all of the electrical equipment and appliances connected to the surge strips 2 of the home control protection system of the present invention is accumulated and displayed on the personal computer 62 (e.g., "$3.65/day", as shown in FIG. 9).

Figure 11:
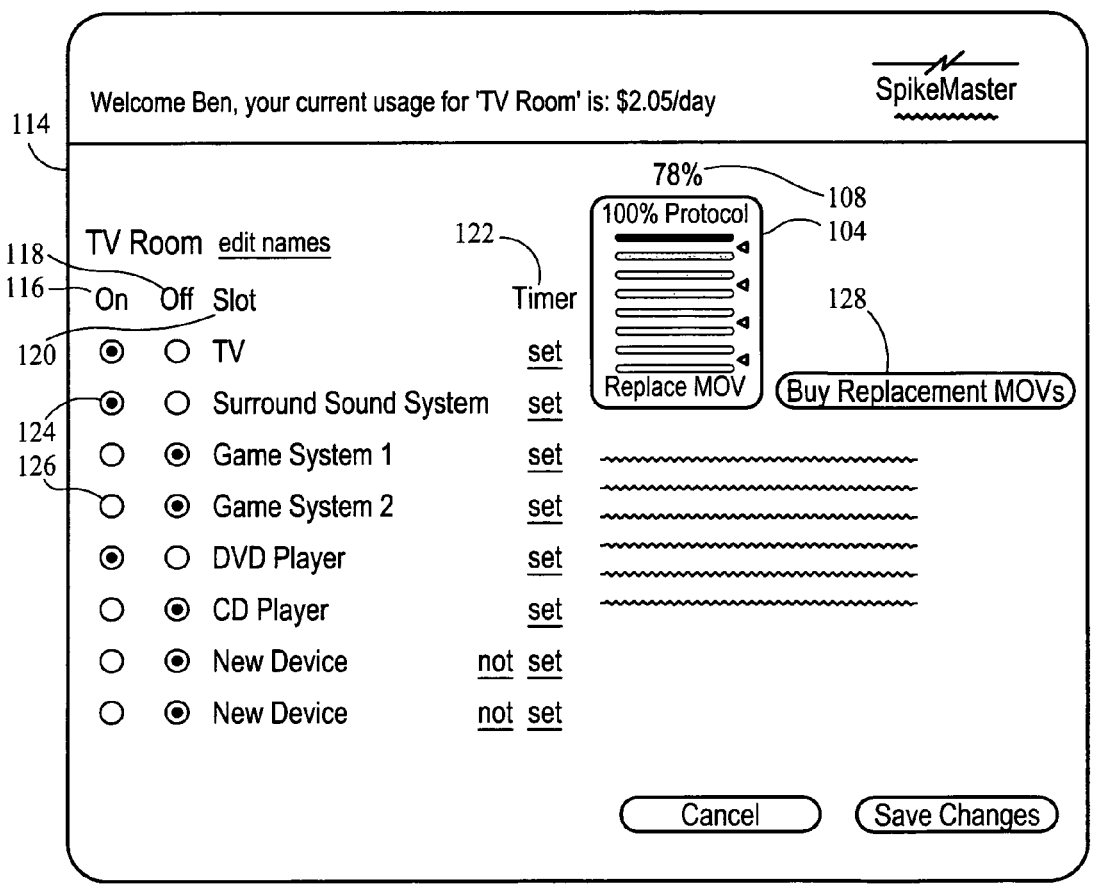
FIG. 11 is an illustrative view of a monitor screen display which is displayed by the home control protection system of the present invention.

If the user wishes to see more information about a particular surge strip 2, he may request that information to be displayed, as shown in FIG. 11. For illustrative purposes only, the display 114 of information relating to the surge strip in the "TV Room" is shown in FIG. 11. The current usage for the electrical equipment and appliances connected to the surge strip 2 in the "TV Room" is displayed on the personal computer 62 (e.g., "$2.05/day", as shown in FIG. 11). Also, preferably, there are four columns 116, 118, 120, 122 which are displayed for the surge strip 2 of a particular location in the home or office, and they are "On", "Off", "Slot", and "Timer".

Under the "Slot" heading 120, the particular electrical equipment or appliance connected to a particular slot (e.g., Slot 1-Slot 8) is identified by name (e.g., "TV", "Surround Sound System", "Game System 1", etc.).

This information is entered by the user through his personal computer 62 when the home control protection system of the present invention is programmed. Under the "On" heading 116 and the "Off" heading 118, and in alignment with the identifying name of the equipment connected to a particular outlet receptacle 4 of the surge strip displayed, are indicators, for example, a lit circle 124 or an unlit circle 126, or an icon, which indicates whether the particular electrical equipment or appliance is on or off (i.e., drawing or not drawing current). Such is determined by the current sensors 50 situated in each surge strip 2 and connected to a corresponding outlet receptacle 4 (see FIG. 3). Thus, the user may determine whether the television is on in the TV room, for example, by looking at the display on the personal computer 62 or the display 46 of the wall mountable central unit 42 of the home control protection system, without having to go to the "TV room" to see if the television or other electrical equipment was inadvertently left on.

Under the heading "Timer" 122, the surge strip 2 forming part of the home control protection system of the present invention may include in the CPU 32 a timer that will turn on or off the electrical equipment or appliance connected to a corresponding outlet receptacle 4 of the surge strip 2. As shown in FIG. 3 and described previously, each surge strip 2 includes a relay 52 connected to one of the power lines provided to a corresponding outlet receptacle 4. This relay 52 is controlled by the CPU 32. Thus, the user may program the home control protection system of the present invention, by using his personal computer 62, or by using the wall mountable central unit 42 of the system, to program the CPU 32 in each surge strip 2 to energize or de-energize a particular outlet receptacle 4 on the surge strip at selected times. If the timer function is set for a particular piece of equipment, a clock icon 114 will be displayed under the "Timer" heading 122 (or the words "set" or "not set" will be displayed) adjacent to and in alignment with the equipment identified under the "Slot" heading. In this way, the user may easily see what equipment connected to a surge strip 2 is set by the timer to go on or off.

As mentioned previously, the accumulated current usage for a particular surge strip 2 is displayed (for example, "$2.05/day", as shown in FIG. 11). Also displayed is a bar graph or segmented display 104 of the remaining life of the MOV 12 for that particular surge strip 2, as well as a numerical indication 108 ("78%", for example) of the life remaining of the MOV 12.

As shown in FIG. 11, there is a field 128 that is displayed for the user to click on if he wishes to purchase a replacement MOV 12. As mentioned previously, this may be done over the Internet. The screen display 114 illustrated by FIG. 11 corresponds to the "Main Status Page 2" block 130 shown in the flow chart of FIG. 7.

Figure 12:
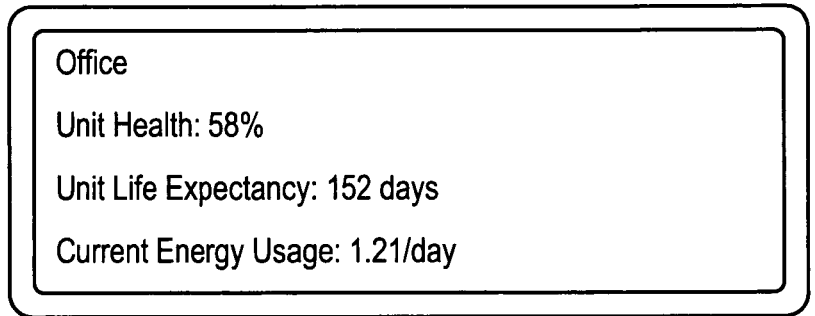
FIG. 12 is an illustrative view of a monitor screen display which is displayed by the home control protection system of the present invention.

If the user wishes to view a text based display of a particular surge strip 2, the home control protection system allows him to do this, and such is displayed on the user's personal computer 62 which interfaces with the home control protection system. Such a text based display 132 is shown in FIG. 12 of the drawings. By way of example, the surge protection strip 2 for the "office" location in the user's home or office is shown. The text information which is displayed may include "Unit Health", which is the percentage of viable life remaining for the replaceable MOV 12 of that particular surge strip 2, the "Unit Life Expectancy", which is a predicted number of days remaining before the replaceable MOV module 12 is expected to fail, which is based on the number of surges absorbed by the MOV 12 over a predetermined period of time, and the "Current Energy Usage", which is the dollar value of the total current drawn through that particular surge strip 2 for that day for all of the equipment connected to the surge strip. FIG. 12 corresponds to the "Main Status Page 3" block 134 of the flow chart shown in FIG. 7.

Figure 13:
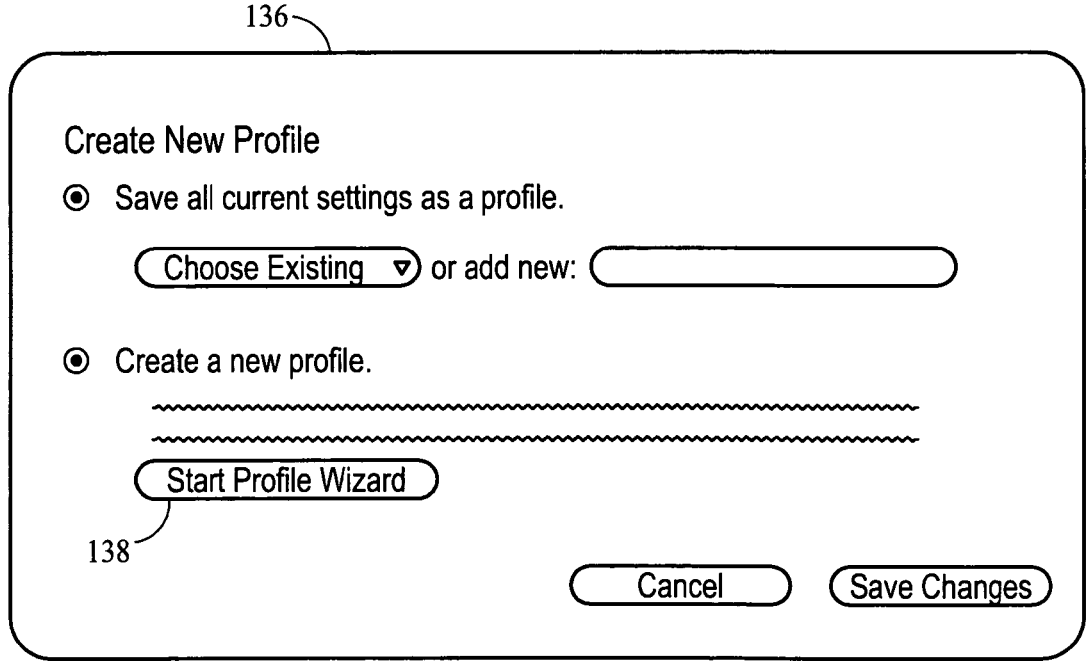
FIG. 13 is an illustrative view of a monitor screen display which is displayed by the home control protection system of the present invention.

The home control protection system of the present invention also allows the user to create, on his personal computer 62, a new profile. Creating a new profile allows the user to name the surge strips 2 and their outlets 4 based on where they are located in the office or residence and what is connected to surge strips. As shown in FIG. 13, a display 136 entitled "Create New Profile" is displayed on the monitor of the user's personal computer 62, or may be shown on the LCD display 46 of the wall mountable central unit 42 of the home control protection system. The user is basically given a choice of saving all of the current settings as a profile, or creating a new profile, with appropriate prompts displayed on the user's personal computer 62, as shown in FIG. 13. A "Profile Wizard" button 138 may be clicked by the user to change the profile. The display 136 of FIG. 13 relates to the "Create Profile" block 140 of the flow chart shown in FIG. 7.

Figure 14:
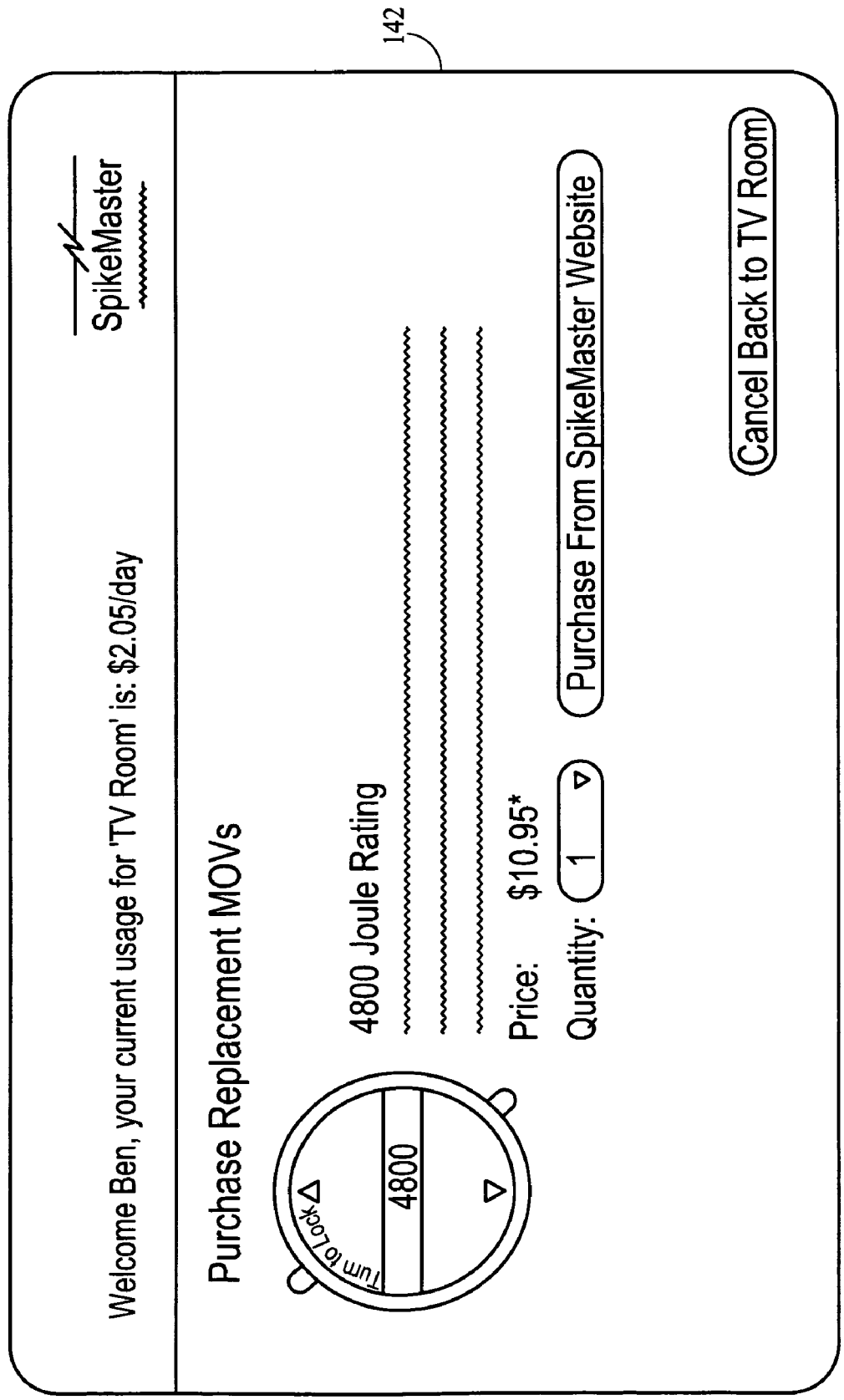
FIG. 14 is an illustrative view of a monitor screen display which is displayed by the home control protection system of the present invention.
Figure 15:
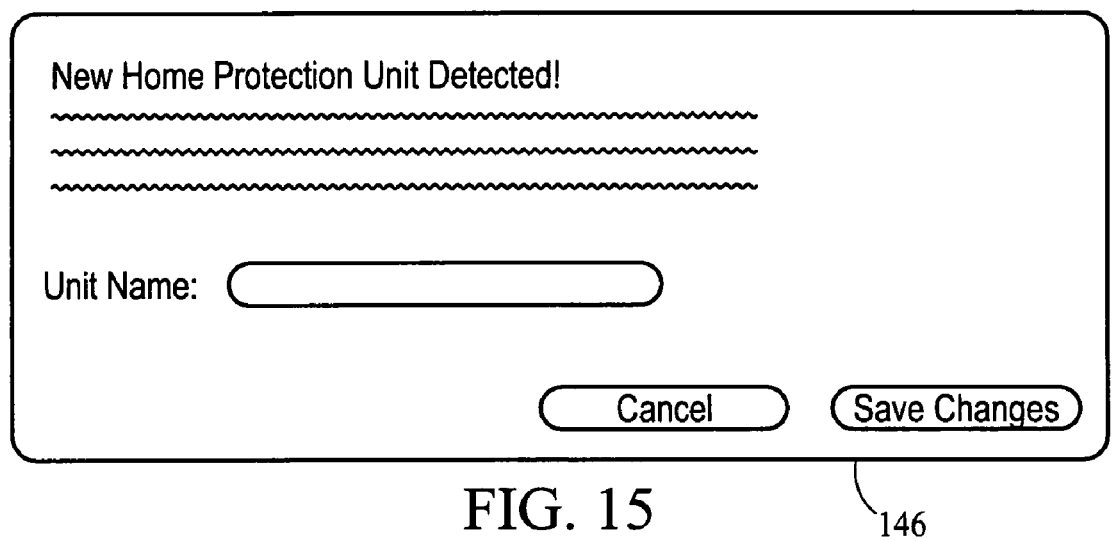
FIG. 15 is an illustrative view of a monitor screen display which is displayed by the home control protection system of the present invention.

As mentioned previously, the home control protection system of the present invention allows the user to purchase replacement MOVs (or more precisely, MOV modules 12) over the Internet from a service provider. FIG. 14 illustrates a screen display 142, which allows the user to make such purchases. The joule rating of the replacement MOV module 12 is illustrated, as well as the price and quantity, which the user can select. Appropriate prompts and fields are provided to allow the transaction to occur. Once purchased, a replacement MOV module 12 is sent by mail by the service provider to the user's designated home or office location. The appropriate MOV module 12, which needs replacing, is preferably displayed, and the user is prompted to purchase the new MOV module by the home control protection system of the present invention. The screen display 142 shown in FIG. 14 corresponds to the block "Purchase MOVs" 144 shown in the flow chart of FIG. 7.

If a new or additional surge strip 2 is energized by the user by connecting it to a wall outlet, for example, the circuitry in the surge strip will communicate with the central unit 42 of the home control protection system and identify itself with a particular code. Each surge strip 2 of the home control protection system has a particular identification code, and this code is used by the system and transmitted to the central unit 42, and the user's personal computer 62 connected to the system, so that the central unit 42 and the personal computer 62 recognize all of the surge strips 2 communicating with the central unit and the personal computer. The identification code is transmitted by the surge strip 2 with the current usage information and the MOV viability and life expectancy information so that the central unit 42 of the home control protection system and the personal computer 62 can properly correspond this information with a particular surge strip 2. Thus, when a new surge strip is powered up by the user, the central unit 42 of the home control protection system, and the personal computer 62 connected thereto, will recognize the new surge strip by its identification code and will display for the user on either the central unit 42 or the personal computer 62 that a new surge strip has been detected, as shown in the screen display 146 illustrated by FIG. 15 of the drawings. With this prompt, the user may enter a desired name for the surge strip 2 (e.g., "TV Room", "Office", or the like), which information will be conveyed to the CPU 72 of the central unit 42 of the home control protection system for subsequent display for the user's information, such as shown in FIG. 9 or FIG. 11 of the drawings. The display 146 shown in FIG. 15 corresponds to the block "New Unit Detected" 148 of the flow chart shown in FIG. 7.

The electronic circuitry of the surge strip 2 and in particular the MOV sensing circuit 54 will now be described in greater detail. First, reference should be had to FIG. 16 of the drawings, which is a chart showing the resistance of a typical MOV after it has absorbed a certain number of surges.

More specifically, it has been found that the resistance of an MOV decreases relatively precipitously near its complete point of failure after it receives a number of surges causing it to switch from a high impedance state to a low impedance state. By monitoring the resistance of the surge suppressor, in this case, an MOV, the home control protection system of the present invention can alert the consumer or a third party, such as a central monitoring company that can supply replacement MOVs to the user, when the MOV module 12 is near failure.

Figure 16:
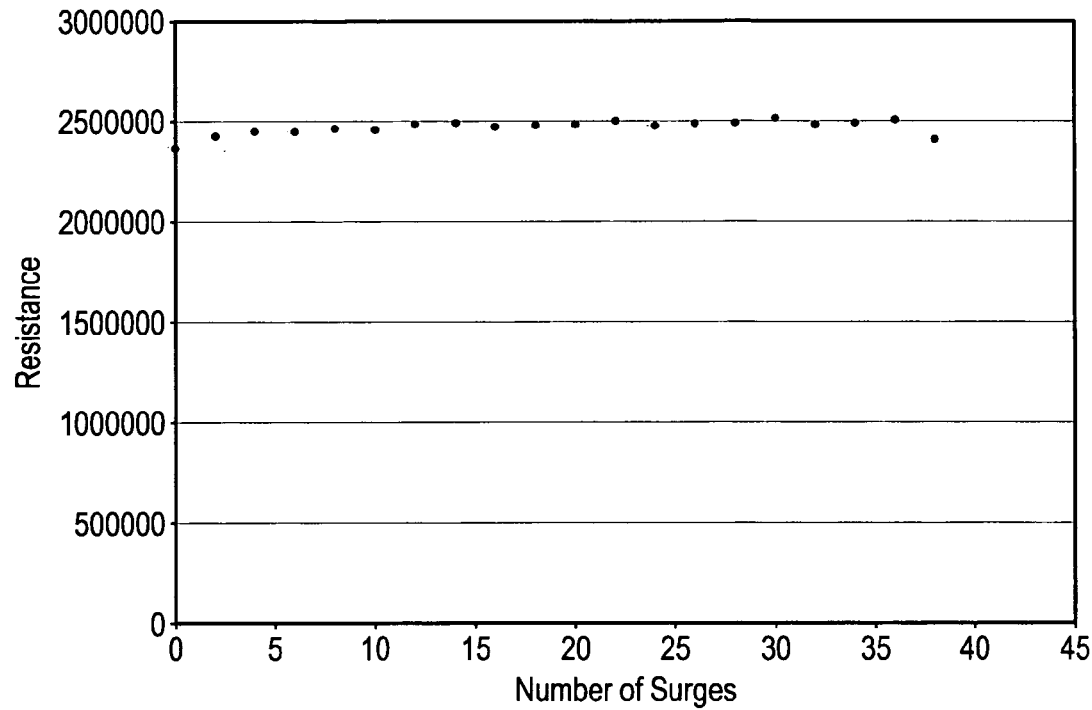
FIG. 16 is a chart plotting resistance against the number of surges for a test MOV.

The chart shown in FIG. 16 shows the resistance of the MOV after a certain number of surges has been received by it and after having switched from a high impedance state to a low impedance state several times. The chart was prepared from tests which were performed using 10,000 volt surges and recording the resistance after every two surges. 10,000 volts is a much higher voltage than most households will receive, excluding lightning on the power line. It is also much higher than for what Underwriters Laboratories tests, which is 6,000 volts. The testing was performed on MOVs having part numbers Y20201U manufactured by Panasonic. From the chart shown in FIG. 16, it can be seen that between the 38th and 40th surges, there is a significant drop in the MOV resistance, and then two surges later, the MOV failed in that it could no longer shift between a high impedance state to a low impedance state, and back to a high impedance state after the surge ended. Thus, through testing, a threshold can be determined for predicting the failure of the MOV. This threshold may be different for MOVs from one manufacturer to another.

Thus, the MOV sensing circuit 54 may include a circuit for estimating the viability of one or more surge protection devices of the removable surge protector module 12, which provides a surge protection viability signal in response thereto. The central control unit 42 includes a display 46 for indicating to the user of the home control protection system to replace the surge protector module 12 in response to the surge protection viability signal. Alternatively, the central control unit 42 may indicate to a third party, such as a monitoring service, over the Internet to send a replacement surge protector module 12 to the user in response to the surge protection viability signal that is generated by the user's home control protection system.

In a preferred form of the present invention, the circuit for estimating the viability of the one or more surge protection devices of the surge protector module 12 may include a circuit for measuring the impedance of the one or more surge protection devices of the surge protector module, and providing a measured impedance signal corresponding to the measured impedance of the one or more surge protection devices of the surge protector module 12. The circuit may further include a circuit, such as a comparator, for comparing the measured impedance of the one or more surge protection devices of the surge protector module 12 in response to the measured impedance signal and a known normal impedance value corresponding to the one or more protection devices of the surge protector module, and providing a comparator output signal indicative of the measured impedance being below the known normal impedance value, where the surge protection viability signal is based in part on the comparator output signal.

Even more specifically, the circuit for measuring the impedance of the one or more surge protection devices of the surge protector module includes a voltage divider network. The voltage divider network has one or more surge protection devices of the surge protector module connected in series with a known impedance. The voltage divider network provides a voltage divider signal to the electronic circuitry of the surge strip 2. Even further specifically, the circuit for measuring the impedance of the one or more surge protection devices of the surge protector module includes a circuit for selectively providing the voltage divider signal to the electronic circuitry, and/or a circuit for selectively interconnecting the one or more surge protection devices of the surge protector module 12 with the voltage divider network. Even more specifically, the circuit for selectively providing the voltage divider signal to the electronic circuit, and/or interconnecting the one or more surge protection devices of the surge protector module 12 with the voltage divider network includes a timer circuit for periodically selectively providing the voltage divider signal to the electronic circuit and/or for periodically selectively interconnecting the one or more surge protection devices of the surge protector module 12 with the voltage divider network. Even more specifically, the CPU 32, which can be a microprocessor or microcontroller, for example, detects when a surge occurs, and after a predetermined period of time after the surge has ended, selectively interconnects the one or more surge protection devices of the surge protector module 12 with the voltage divider network and/or selectively provides the voltage divider signal to the electronic circuitry, such as the CPU 32.

Figure 17:
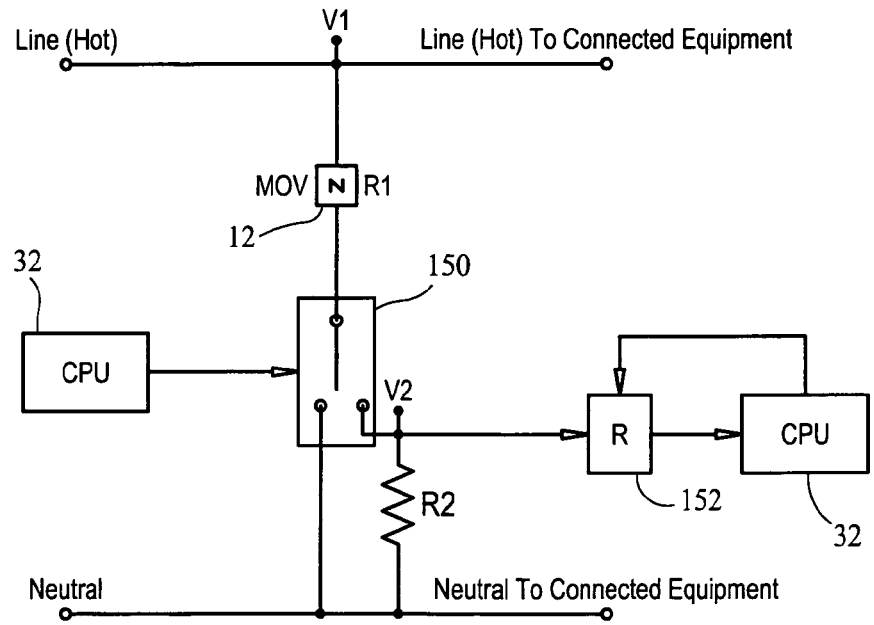
FIG. 17 is a schematic diagram of a circuit formed in accordance with the present invention for measuring the impedance of the replaceable MOV module.

Reference should now be had to FIG. 17 of the drawings, where such a voltage divider network, controlled by the CPU 32 (e.g., microprocessor or microcontroller), is shown. The MOV, or more precisely, the MOV module 12, is selectively placed in series with a known resistance, R2. The overall resistance of the MOV module 12 is R1.

The CPU 32 controls a switching circuit 150, such as a single pole, double throw electronic switch, which normally has the replaceable MOV module 12 connected between the line ("hot") voltage and the neutral line voltage, in one state of the switching circuit 150. In this state, the known resistance R2 is disconnected from the circuit. The CPU 32 includes a timer circuit (or a separate timer circuit may be used) which periodically switches the switching circuit 150 from the first state, where the replaceable MOV module 12 is connected between the hot and neutral lines, to a second state, where the MOV module 12 is connected in series with the known resistance R2, where the series combination of the MOV module 12 and the resistor R2 is connected between the hot and neutral lines of the AC power provided to the surge strip 2. In an even more preferred form of the present invention, the CPU 32 detects when a surge has occurred, and after a predetermined period of time after the surge has ended, changes the state of the switching circuit 150 from the first state to the second state so that the replaceable MOV module 12 is connected in series with the known resistance R2. By having the CPU 32 switch the electronic switching circuit 150 from the first state to the second state after a predetermined period of time following the end of a detected surge, it is highly unlikely that another surge will occur during the time when the impedance of the MOV module 12 is being tested and the MOV module is interconnected with the voltage divider network. The purpose of switching the switching circuit 150 after a surge has occurred is to avoid having a surge occur at the same time an impedance test on the replaceable MOV module 12 is being conducted. Since the MOV will change from a high impedance state to a low impedance state when a surge occurs, clamping the voltage between the hot and neutral lines to approximately 330 volts, that voltage would have appeared at the junction between the MOV module 12 and the known resistance R2, thus possibly exposing the CPU 32 to a clamped voltage of approximately 330 volts, which voltage would damage the CPU.

As shown in FIG. 17, the voltage between the hot and neutral lines of the AC power provided to the surge strip 2 is designated as voltage V1, and the voltage appearing at the voltage divider network which is provided to the CPU is designated as voltage V2. When the MOV module 12 is selectively interconnected with the voltage divider network, the resistance of the MOV may be measured by Equation 1 stated below:

$$R_{MOV} = (R_2 V_1 - R_2 V_2)/V_2 \qquad \text{(Equation 1)}$$

where the voltages $V_1$ and $V_2$ and the resistance $R_2$ are known. Thus, the resistance of the MOV module 12 may be determined. Preferably, the resistance R2 is selected such that the voltage V2 provided to the CPU 32 is a low voltage, which is on the order of 60 millivolts AC for a new MOV 12. Voltage V2 is then offset with a DC voltage (not shown) and inputted into the CPU 32 where it is measured.

As stated previously, the resistance of an MOV from different manufacturers may vary. Samples of MOVs from four different manufacturers were tested and the resistance was measured. Each sample MOV was new and had not previously undergone any testing. The results of the measurements of the resistance of the MOV is shown in Table I below:

TABLE I

| Manufacturer | Part Number | Resistance (In Megaohms) |
| --- | --- | --- |
| Panasonic | Y20201 | 2.27 |
| Ceremate | 20D201K | 1.90 |
| Maida | Z131201L | 1.40 |
| Epcos | S20K130E3 | 1.83 |

Alternatively, to protect the CPU 32, the MOV module 12 may be connected in series with the known resistance R2, with the switching circuit 150 being omitted. A relay 152 or other switching circuit may be connected to the CPU 32 and to the juncture or connection between the replaceable MOV module 12 and the known resistance R2 so that the voltage V2 may be selectively provided to the input of the CPU 32, with the relay 152 being controlled by the CPU. Again, the CPU 32 may switch the relay 152 to a conductive state between the known resistance R2 and the input of the CPU to provide the voltage V2 to the CPU 32 after a predetermined time period following the end of a surge, or the CPU 32 may include a timer which periodically connects the juncture between the replaceable MOV module 12 and the known resistance R2 with the input of the CPU 32 by switching the state of the relay 152 or switching circuit, in order to protect the CPU from any line surges.

The CPU 32 includes a memory 34 which has stored therein a known normal impedance value for the replaceable MOV module 12. The CPU 32 further includes a comparator circuit which compares the measured impedance signal of the replaceable MOV module 12 corresponding to voltage V2 with the known normal impedance value of the replaceable MOV module 12, and this comparator circuit outputs a signal indicative of the measured impedance being below the known impedance value. The surge protection viability signal, which is provided to the central control unit 42 of the home control protection system, is based at least in part on the output signal from the comparator circuit of the CPU 32. Thus, when a change in the impedance of the replaceable MOV module 12 is detected, it can be assumed that one or more of the MOVs internal to the module will soon be failing and that the MOV module 12 should be replaced.

Figure 18:
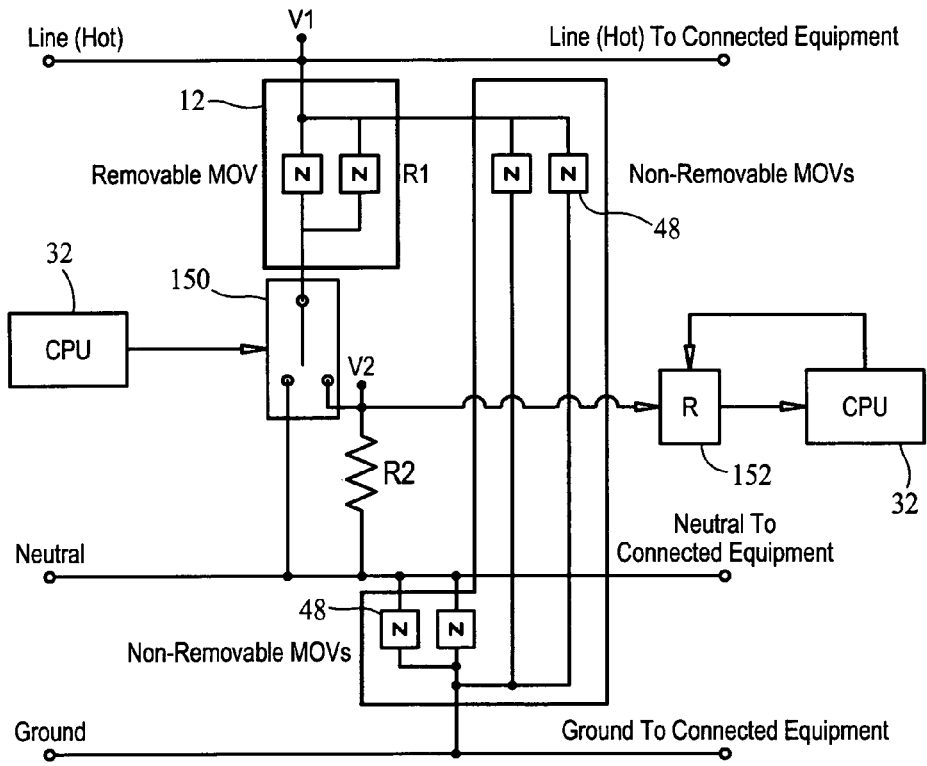
FIG. 18 is a schematic diagram of an alternative circuit formed in accordance with the present invention for measuring the impedance of the replaceable MOV module.

FIG. 18 is a more detailed block diagram of the MOV sensing circuit 54 and voltage divider network shown in FIG. 17. Here, a removable MOV module 12 is shown as having two MOVs connected in parallel. The removable MOV module 12 is connected between the hot and neutral lines of the AC power provided to the surge strip 2. As mentioned previously, there are also preferably non-removable MOVs 48 in the surge strip 2 of the home control protection system of the present invention. As shown in FIG. 18, a pair of MOVs 48, connected in parallel, are situated between the hot and ground lines of the AC power provided to the surge strip, and another pair of non-removable MOVs 48, connected in parallel, are situated and connected between the neutral line and the ground line of the AC power provided to the surge strip 2. It has been determined that most surges will occur between the hot and neutral lines of the AC power, but for further protection, the non-removable MOVs 48 are provided between the hot and ground, and neutral and ground, lines. In all other respects, the MOV sensing circuit 54 shown in FIG. 18 operates in the same manner described previously with respect to the MOV sensing circuit 54 shown in FIG. 17.

In another form of the present invention, the MOV sensing circuit 54 may include a surge detection circuit. The surge detection circuit, with the CPU 32 or other discrete components, determines a projected relative time when one or more surge protection devices of the surge protector module 12 will fail by being incapable of selectively changing from a high impedance state to a low impedance state.

Generally, the electronic circuit determining the projected relative time when the one or more surge protection devices making up the surge protector module 12 will fail includes a counter, which may be part of the CPU 32 or may be a discrete component, for counting the number of power surges that are at least equal to a predetermined magnitude received by the at least one surge protection strip of the home control protection system. This counter provides a counted number of power surges signal. Then, there is a circuit which determines the rate of power surges that at least equal the predetermined magnitude received by the surge protection strip 2 in response to the counted number of power surges signal. Again, this circuit for determining the rate of power surges may be part of the CPU 32 of the surge strip 2, and it provides a rate of power surges signal.

The circuit for determining a projected relative time when the one or more surge protection devices of the surge protector module 12 will fail further preferably includes a storage device, such as a memory 34, which may form part of the CPU 32 or be a discrete component, that stores a threshold maximum power surge number which corresponds to a predicted maximum number of power surges before failure of the one or more surge protection devices of the surge protection module 12 will occur. The circuit for determining the projected relative time when the one or more surge protection devices of the surge protector module 12 will fail by being incapable of selectively changing from a high impedance state to a low impedance state is responsive to the counted number of power surges signal, the threshold maximum power surge number and the rate of power surges signal, and provides a projected failure time signal in response to these signals. The central control unit 42 of the home control protection system of the present invention includes an indicator, such as the display 46, which advises the user of the home control protection system of the estimated viability of the surge protector module 12 having the one or more surge protection devices. The display 46 may indicate to the user in a percentage form the usable life remaining for the replaceable MOV module 12. Alternatively, the central control unit may indicate to a third party, such as a monitoring service, that the replaceable MOV module 12 is nearing the end of its predicted usable life, and that the monitoring service should either notify the user of this fact, or send a replacement MOV module 12 to the user. The user will then remove the deteriorated MOV module from the surge strip 2, and replace it with the new module 12.

Figure 19:
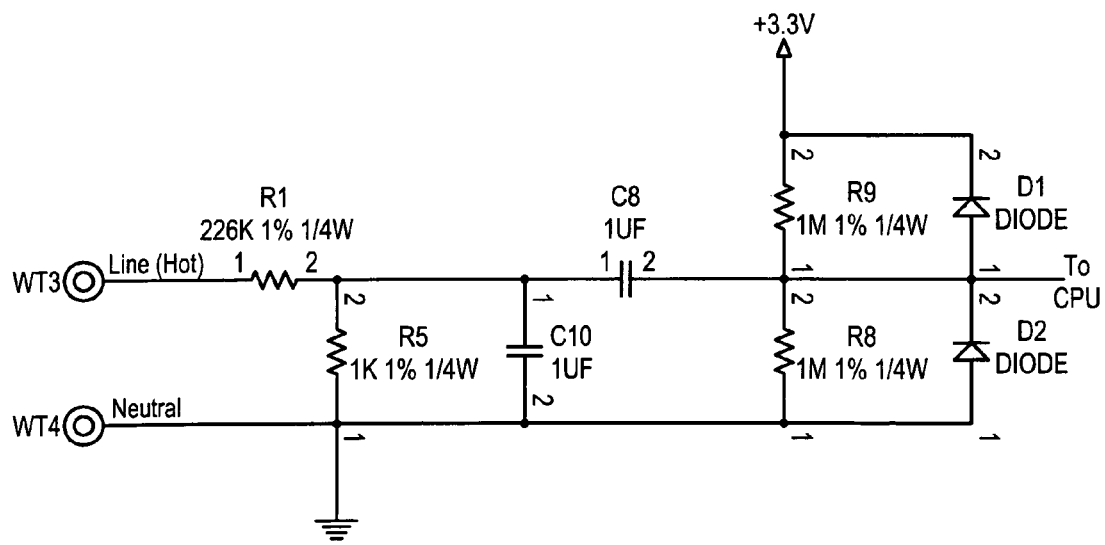
FIG. 19 is a schematic diagram of a circuit formed in accordance with the present invention used for measuring the duration and counting the number of power surges detected by the home control protection system of the present invention.

Now referring to FIG. 19 of the drawings, a circuit for detecting the occurrence of surges forming part of the MOV sensing circuit 54 of the surge strip 2 of the present invention is shown. The circuit includes a voltage divider network circuit comprising resistors R1 and R5 connected in series across the line ("hot") and neutral wires of the AC power supply. When the replaceable MOV module 12 changes from a high impedance state to a low impedance state, a surge between the hot and neutral lines on the AC power will be clamped to 330 volts approximately. The 330 volts is divided by the voltage divider network so that only about 1.45 volts, or another safe voltage, appears across resistor R5 when a surge occurs. Connected in parallel with resistor R5 is a filter capacitor C10, and connected in series with the parallel combination of resistor R5 and capacitor C10 is another filter capacitor C8. One end of capacitor C8 is connected to the junction of a pair of series connected resistors, R8 and R9, which series connection is connected between a DC voltage source (3.3 volts) and the neutral line, which may be grounded. Resistors R8 and R9 provide a DC (direct current) level shift voltage of about 1.65 volts to the detected surge voltage signal (approximately 1.45 volts) so that it is in the operating range of the CPU 32 and so that the CPU can detect and count the number of surges and the duration of each surge which causes the MOV module 12 made up of one or more MOVs to conduct. Diodes D1 and D2 are connected in series with one another, with the anode of diode D1 connected to the cathode of diode D2, and the junction of the diodes D1, D2 being connected to the junction of resistors R8 and R9. Furthermore, diodes D1 and D2 are connected in parallel respectively with resistors R9 and R8, the series connection of diodes D1 and D2 being also connected between the DC bias voltage (3.3 volts) and the neutral line which is shown grounded.

The CPU 32 receives the biased surge detected signal, and includes a counter which counts the number of surges received by the particular MOV module 12 and the surge strip 2. The CPU 32 further includes a timer circuit which determines the rate of surges received over a predetermined period of time, for example, one month. The counted number of surges and the rate of surges are stored in the memory 34 of the CPU 32. Also stored in the memory 34 of the CPU 32 is a threshold maximum power surge number, which corresponds to a predicted maximum number of power surges that the replaceable MOV module 12 can absorb before the one or more MOVs within the module will fail. The CPU 32 determines a projected relative time when the MOV module 12 will fail based on the counted number of power surges, the threshold maximum power surge number and the rate of power surges that have been calculated and stored in its memory 34, and provides a projected failure time signal to the central control unit 42 of the home control protection system of the present invention in response to such calculations. The central control unit 42, in response, indicates on its display 46 to the user a projected failure time of the MOV module 12 and/or the predicted usable life remaining in the MOV module 12 so that the user has sufficient time to obtain a substitute MOV module for the respective surge strip 2. For example, the central control unit 42 may indicate to the user on its display 46 that it is projected that the surge protection for the surge strip 2 will fail at a particular month and particular year.

Alternatively, and in response to the projected failure time signal, the central control unit 42 may contact through the Internet a monitoring service, which will send a replacement MOV module 12 to the user at the appropriate time prior to the projected failure date calculated by the CPU 32.

Figure 20:
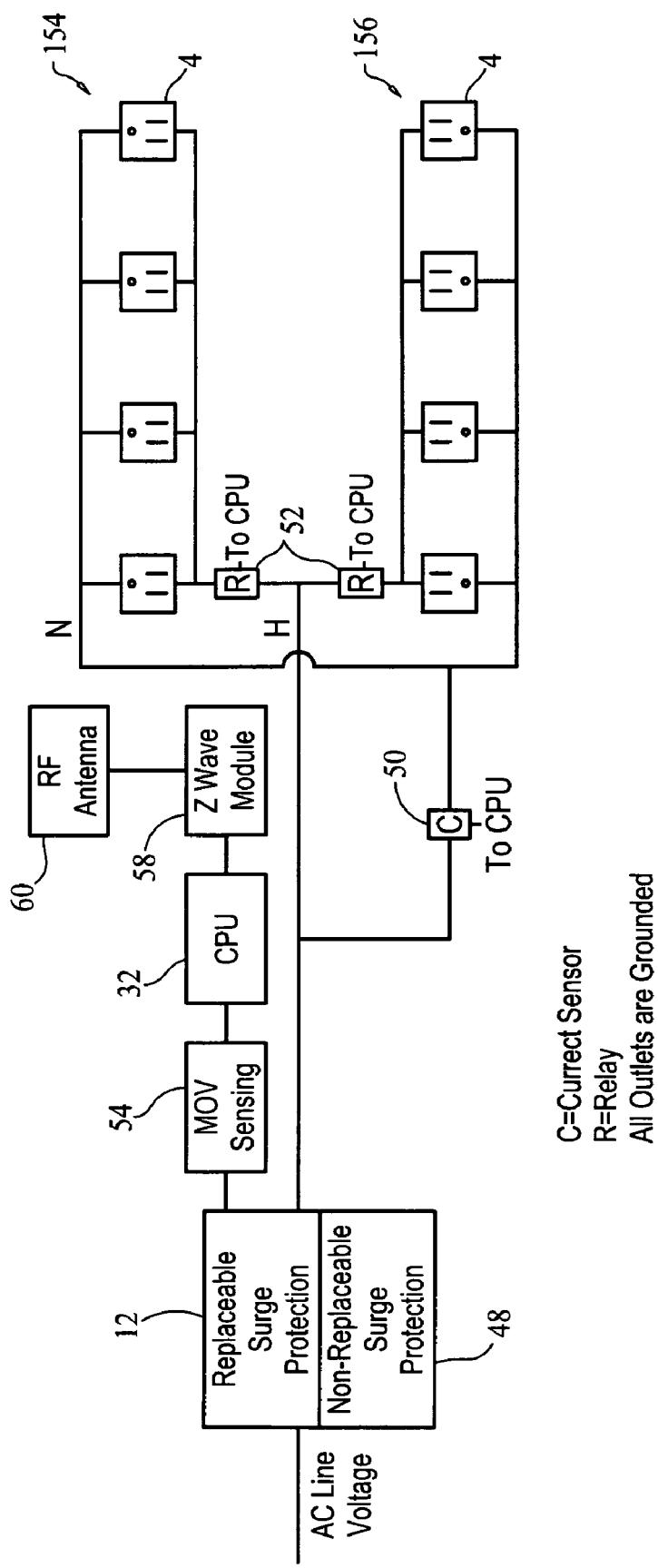
FIG. 20 is a block diagram of various components of an alternative form of the circuit of the surge protection strip forming part of the home control protection system of the present invention.

An alternative form of the electronic circuit for the surge strip 2 of the home control protection system of the present invention is shown in FIG. 20. The electronic circuit shown in FIG. 20 is very similar to the circuit shown in FIG. 3 of the drawings. However, in the electronic circuit shown in FIG. 20, there are two banks 154, 156 of outlets 4, each bank 154, 156 being individually controlled by the CPU 32 in the surge strip 2 through a relay 52 connected to the hot line of the AC power. In this way, the central control unit 42 of the home control protection system can signal the CPU 32 in a particular surge strip 2 to energize or de-energize one of the two banks 154, 156 of power outlets 4 by either commands the user enters into the central control unit 42 by way of the keyboard or keys 70 on the central control unit, or in accordance with pre-entered timing instructions to the central control unit 42 in response to output signals provided by the timer circuit in the central control unit 42 which are transmitted to the surge strip 2 to automatically control the power provided to an electrical device, such as a television or a lamp, connected to an outlet 4 in either bank 154, 156 of power outlets of the surge strip 2.

Furthermore, for conducting power measurements, in the electronic circuit shown in FIG. 20, only one current sensor 50 is provided for all of the outlets 4 of the surge strip 2. The current sensor 50 is preferably connected between the hot and neutral lines of the AC power provided to the surge strip 2, and the output signal of the current sensor 50, which may be a resistor, is provided to the CPU 32 of the surge strip 2, which calculates the accumulated power used over a predetermined period of time by the electrical devices connected to the outlets 4 of that particular surge strip.

Figure 21:
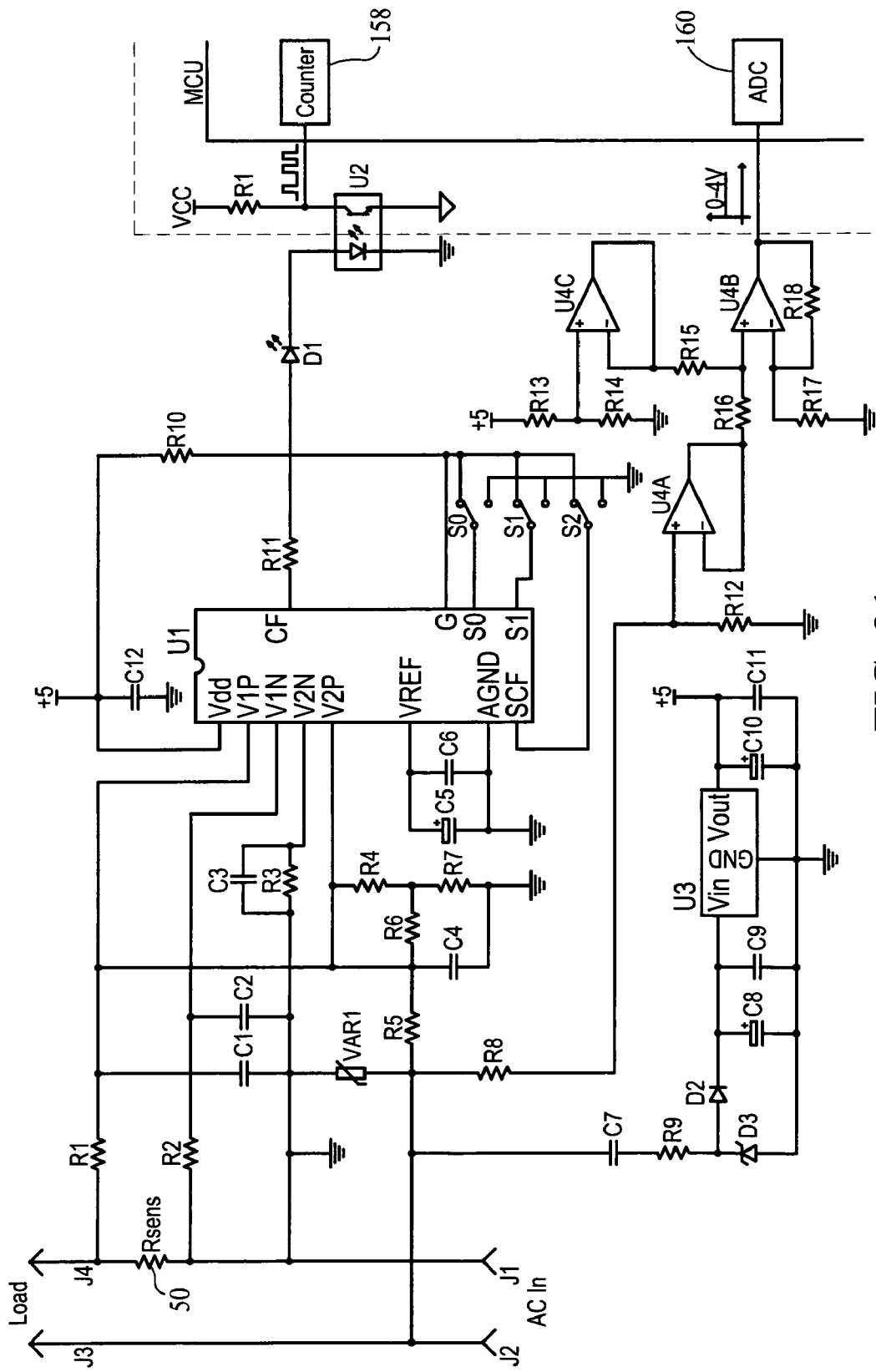
FIG. 21 is a schematic diagram of a power management circuit formed in accordance with the present invention forming part of the home control protection system.

FIG. 21 illustrates one preferred form of a power measurement circuit for measuring the power used by electrical devices connected to a surge strip 2 over a predetermined period of time. When viewing the circuit shown in FIG. 21, on the left side labeled "Load" are the banks of outlets 4, which are connected to the AC power provided to the surge strip 2. The current sensor 50 is shown as a resistor Rsens, and the voltage developed across the current sensor 50 is provided through resistors R1 and R2 to the inputs of a single phase energy meter integrated circuit having an integrated oscillator (U1). In the electronic circuit shown in FIG. 21, the line denoted by connecter J3 is the "hot" line, and the line denoted by connector J4 is the neutral line of the AC power provided to the surge strip 2. A voltage regulator comprising integrated circuit U3 and its associated components connects to the hot line of the AC power and provides a regulated 5 volt DC power for operating the various integrated circuits and providing a regulated threshold for the power measurement circuit shown in FIG. 21.

The output of the single phase energy meter integrated circuit U1 illuminates an LED D1 through current limiting resistor R11 and is provided to the input of photocoupler U2. The output of photocoupler U2 provides digital pulses to a counter circuit 158 in the CPU 32, or more preferably, the MCU of the Zwave module 58. Furthermore, the line voltage, reduced by a voltage divider network including resistors R8 and R12 interconnected in series, is provided to the input of a buffer circuit U4A and to the input of an amplifier circuit including operational amplifier U4B, feedback resistor R18 and input resistors R16 and R17. A DC offset voltage circuit comprising a voltage divider network having series interconnected resistors R13 and R14 is coupled between the regulated DC voltage and ground. The reduced offset voltage from the voltage divider network is provided to a buffer circuit U4C whose output, provided through input resistor R15, is summed with the buffered and reduced line voltage signal from circuit U4A and provided to amplifier circuit U4B. Amplifier circuit U4B provides an analog output signal in the range of zero to 4 volts, preferably. This analog output signal is provided to an analog-to-digital converter (ADC) 160 in the CPU 32 or, more preferably, in the MCU of the Zwave module 58. Together, the counter 158 and the ADC 160 of the Zwave module 58 (or the CPU 32) can determine from the signals provided to each of the counter and ADC the accumulated power drawn by the electrical devices connected to the surge strip 2 over a predetermined period of time, and a signal corresponding to this information is provided to the central control unit 42 to be displayed on the display 46 thereof. In this way, the user may monitor the power consumed by the electrical devices in a particular room where the surge strip 2 is located and which are connected to the surge strip.

Table II shown below lists the components and their preferred values of the power measurement circuit shown in FIG. 21.

TABLE II

Power Measurement Circuit

| Part Name | Description | QTY | Part Number |
|---|---|---|---|
| PCB | 35 * 70 mm T = 1.6 mm FR-4 | 1 | |
| Chip Capacitor | 33 nF 25 V ±10% X7R 0805 | 3 | C1, C2, C5 |
| Chip Capacitor | 6800 pF 25 V ±10% X7R 0805 | 1 | C6 |
| Chip Capacitor | 68 nF 25 V ±10% X7R 0805 | 1 | C7 |
| Chip Capacitor | 0.1 uF 25 V ±10% X7R 0805 | 6 | C3, 8, 13, 15-17 |
| Chip Capacitor | 1 uF 25 V ±10% Y5V 0805 | 1 | C9 |
| Safety Capacitor | 0.1 uF 300 V ±10% 6 * 13 * 12 mm P = 10 mm | 1 | C10 |
| E-Capacitor | 4.7 uF 450 V ±20% 105☐ 10 * 16 mm | 1 | C11 |
| E-Capacitor | 47 uF 16 V ±20% 105☐ 5 * 11 mm | 1 | C12 |
| E-Capacitor | 220 uF 10 V ±20% 105☐ 6 * 11 mm | 1 | C14 |
| E-Capacitor | 100 uF 10 V ±20% 105☐ 6 * 11 mm | 1 | C18 |
| E-Capacitor | 10 uF 10 V ±20% 105☐ 5 * 11 mm | 1 | C4 |
| LED | RED 3 mm | 1 | D1 |
| SM Diode | UF1G SMA | 1 | D2 |
| SM Diode | M7 SMA | 1 | D3 |
| SM Diode | BAT54S SOT-23 | 1 | D4 |
| Choke coil | 3.3 mH ±20% 3 * 10 mm | 1 | L1 |
| Power Inductor | 680 uH ±20% 8 * 10 mm | 1 | L2 |
| Chip Ferrite Bead | 330R@100M, 1.5 A 0805 | 1 | L3 |
| Photo-Coupler | KPC357NT mini-flat package | 2 | OP1, OP2 |
| Chip Resistor | 2.2 ±5% 0805 | 1 | R17 |
| Chip Resistor | 680 ±5% 0805 | 1 | R18, 28 |
| Chip Resistor | 1K ±5% 0805 | 4 | R1, 15, 19, 24 |
| Chip Resistor | 2K ±5% 0805 | 1 | R13 |
| Chip Resistor | 4.7K ±5% 0805 | 1 | R12 |
| Chip Resistor | 8.2K ±5% 0805 | 1 | R11 |
| Chip Resistor | 10K ±1% 0805 | 2 | R26, 27 |
| Chip Resistor | 18K ±5% 0805 | 1 | R10 |
| Chip Resistor | 51K ±5% 0805 | 1 | R9 |
| Chip Resistor | 75K ±5% 0805 | 1 | R8 |
| Chip Resistor | 100K ±1% 0805 | 1 | R23 |
| Chip Resistor | 150K ±5% 0805 | 1 | R7 |
| Chip Resistor | 18k ±1% 0805 | 1 | R22 |
| Chip Resistor | 47k ±1% 0805 | 1 | R22' |
| Chip Resistor | 300K ±1% 0805 | 1 | R6 |
| Chip Resistor | 510k ±5% 0805 | 1 | R5 |
| Chip Resistor | 1M ±5% 0805 | 4 | R3, 4, 16, 29 |
| Chip Resistor | 910 ±5% 0805 | 1 | R2 |
| Chip Resistor | 510k ±1% 1206 | 2 | R20, 21 |
| IC | BL0930 SOIC-16 | 1 | U1 |
| IC | CJ431 SOT-23 | 1 | U2 |
| IC | NCP1014ST65T3G SOT-223 | 1 | U3 |
| IC | 6206P332MK 3.3 V 300 mA SOT-23 | 1 | U4 |
| Varistor | 14D561K 350VAC | 1 | VR1 |

Figure 22:
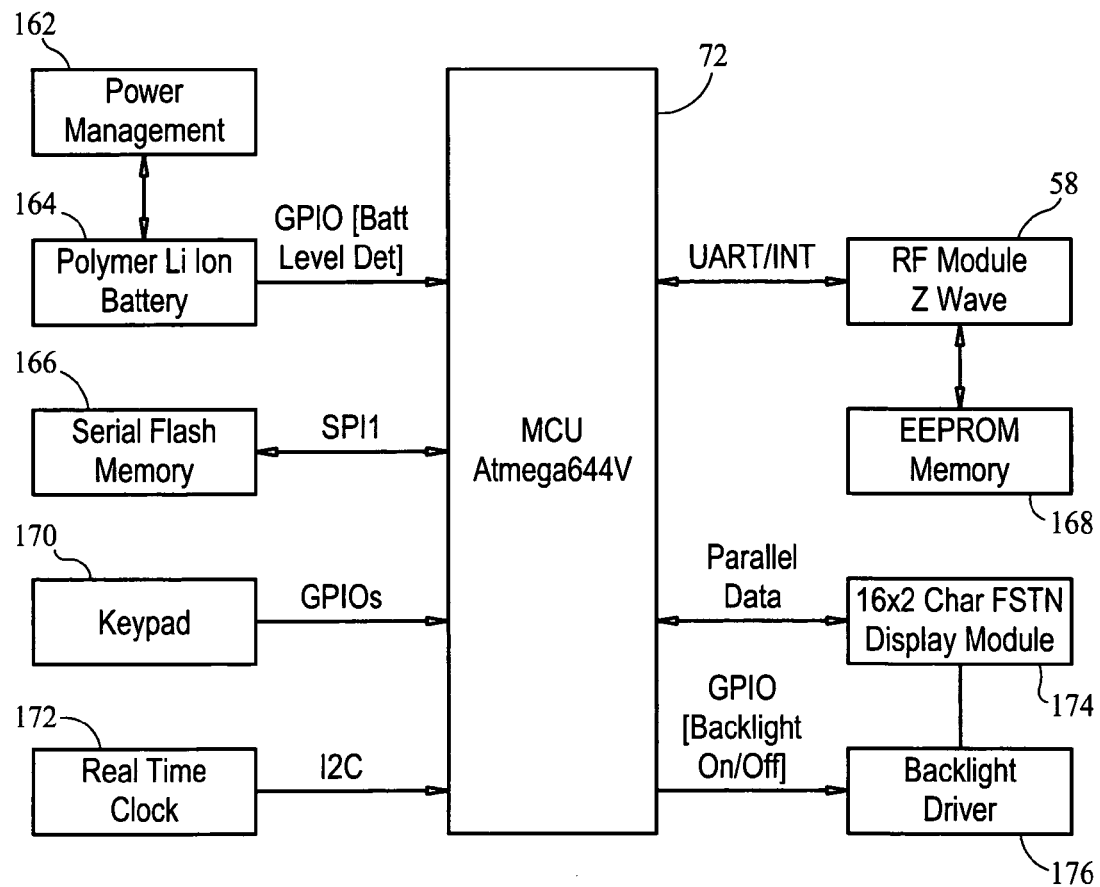
FIG. 22 is a block diagram of an alternative circuit of the central unit of the home control protection system of the present invention.

FIG. 22 is a functional block diagram of a preferred form of that portion of the electronic circuitry of the central control unit which relates to the measurement and display of the accumulated power. As shown in FIG. 22, the electronic circuit includes a power management circuit 162, such as a power supply and DC regulator, to provide the necessary voltage to power the various integrated circuits and discrete components of the central control unit 42. Alternatively, or in conjunction with the power management circuit 162, the central control unit 42 may include a rechargeable battery 164, which is maintained in a fully charged state by the power management circuit 162 and whose voltage level is detected by the CPU 72 or microcontroller of the central control unit 42.

The central control unit 42 further includes one or more memories, such as a serial flash memory 166 and an electronically erasable programmable read only memory (EEPROM) 168.

The EEPROM 168 is connected to a transceiver circuit, such as a Z-wave RF module 58, which in turn is electrically connected to the microcontroller or CPU 72 of the central control unit 42. The serial flash memory 166 is connected to the microcontroller or CPU 72.

The central control unit 42 further includes a keypad 170 (or individual keys 70) connected to the CPU 72 or microcontroller for the user to program the home control protection system or enter instructions into the central control unit 42. Furthermore, a real time clock 172 is connected to the CPU 72 or microcontroller.

The CPU 72 or microcontroller of the central control unit 42 is connected to a display module 174 which includes a display 46 and associated circuitry, the display 46 being mounted on the housing thereof to provide information to the user, such as the accumulated power over a predetermined period of time drawn by the electrical devices connected to a particular surge strip 2. Also, the central control unit 42 includes a backlight and driver circuit 176 which is connected to the microcontroller or CPU 72 to provide backlighting for the display 46.

The CPU 72 of the central unit 42 of the home control protection system of the present invention monitors the MOVs and the surges, and stores the information in memory 34. An algorithm is applied that would estimate the future time of failure of the MOVs 12. The user is notified as to the estimated failure date and the life remaining in each replaceable MOV module 12.

Figure 23:
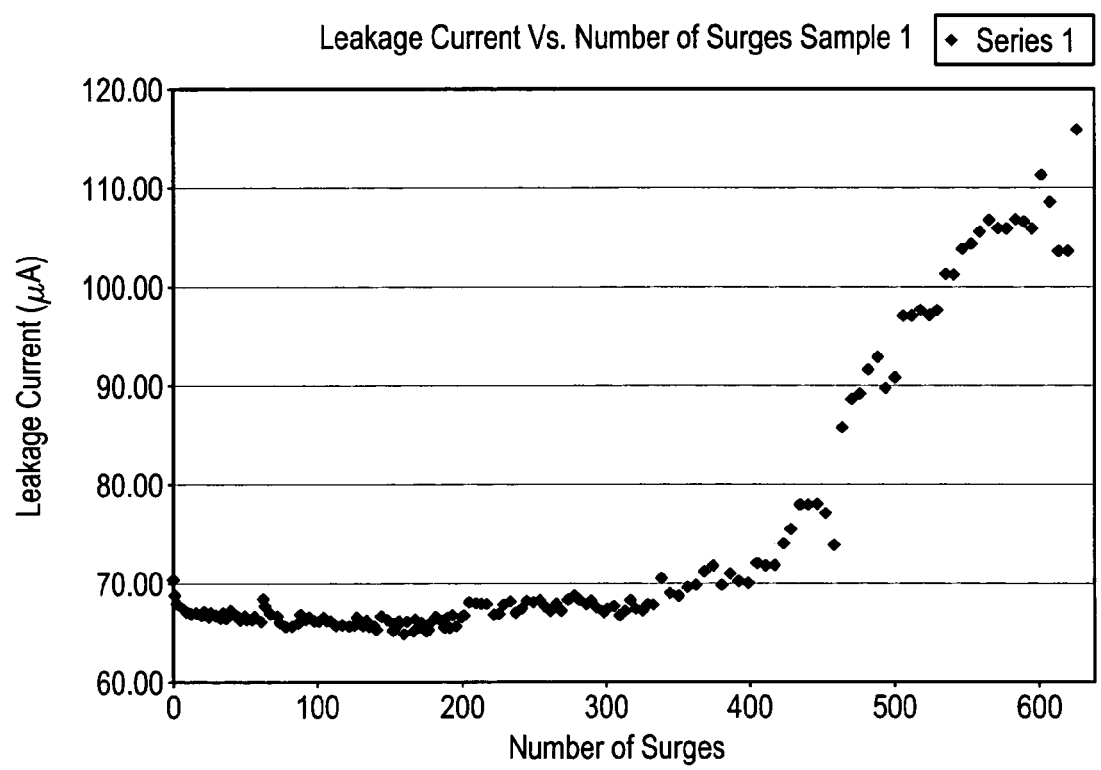
FIG. 23 is a chart plotting leakage current against the number of surges for a test MOV.
Figure 24:
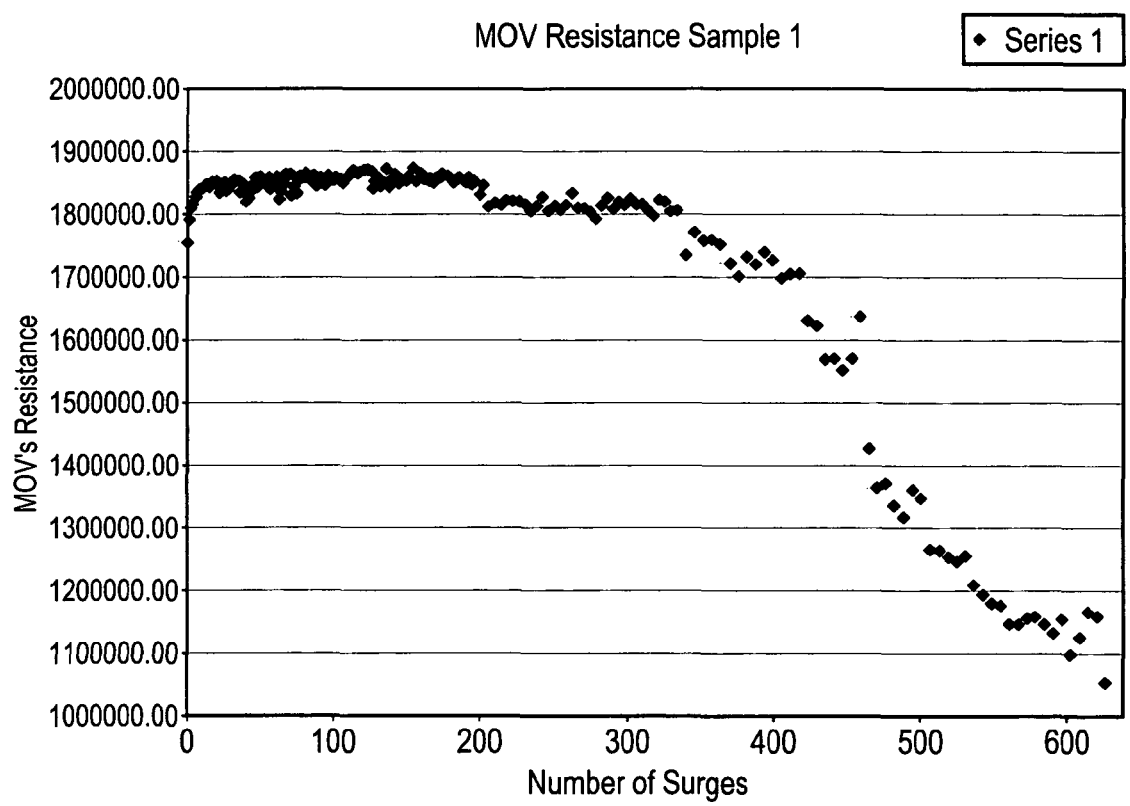
FIG. 24 is a chart plotting resistance against the number of surges for a test MOV.
Figure 25:
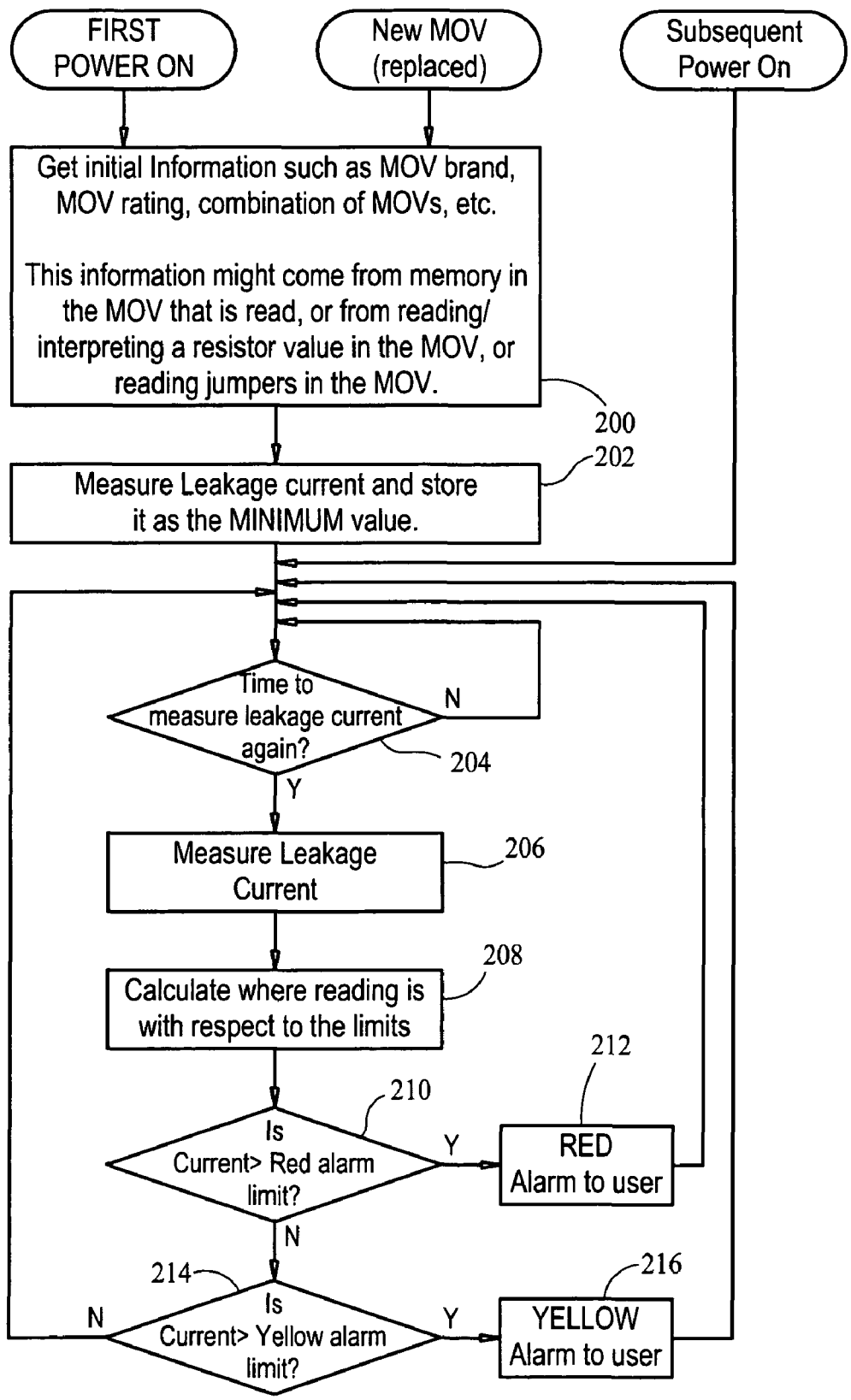
FIG. 25 is a flow chart for a method in accordance with the present invention of measuring the viability of an MOV module and providing a warning signal to the user as to the viability of the MOV module.

FIG. 24 is a chart plotting the change in leakage current of an MOV against the number of surges absorbed by the MOV for a different test MOV than that tested with respect to the chart shown in FIG. 16, and FIG. 24 is a chart plotting the resistance of the MOV against the number of surges absorbed by the MOV for the same MOV tested with respect to the chart shown in FIG. 23. The prediction of the surge protector module's failure is used to warn the user that the surge protector module containing one or more MOVs may be nearing the end of its usable life. It has been found that there is a correlation between the MOV leakage current (or resistance, as shown in FIG. 24, and as discussed previously with respect to FIG. 16), and the MOV life cycle and MOV end of life (EOL). The leakage current is related to the resistance of the MOV by Ohm's Law, and either the resistance or the leakage current of the MOV may be monitored to predict the EOL of the MOV.

As can be seen from the chart shown in FIG. 23, the change in the leakage current of the MOV may be used to calculate a limit or limits pertaining to the viability of the MOV, which are then used to warn the user of a possible failure of the MOV. The steps in predicting a failure in the MOV (or more precisely, the MOV module 12) is shown in the flow chart illustrated by FIG. 26.

In the flow chart shown in FIG. 26, there are two limits (a red and yellow warning light may be selectively lit on the surge strip 2, such as indicator light 24, or, more preferably, on the central control unit 42). Of course, it is envisioned to be within the scope of the present invention to have a greater number of limits or warning lights, or a lesser number, than what is shown in FIG. 26.

There are a number of methods envisioned to be within the scope of the present invention to predict the EOL of an MOV, and to provide warnings to the user in this regard. A running average of the leakage current calculated by the CPU 32 could be used to calculate one or more of the limits. Another method may be as simple as making the limit equal to some constant multiplied by the minimum leakage current.

In accordance with one form of a method for predicting the failure of the MOV module 12, and referring to the flow chart shown in FIG. 26, it will be seen that when the surge strip 2 of the home control protection system is first powered on, or after the surge strip 2 has received a replacement MOV module 12, the CPU 32 will obtain from the memory 34 the manufacturer of the MOV or MOVs used in the MOV module 12, the MOV rating, or other pertinent information relating to one or a combination of MOVs making up the MOV module 12. This pertinent information may have been already stored in the memory 34 in the surge strip, which information is read from memory 34 by the CPU 32. Alternatively, the CPU may read or interpret the resistance of an MOV identifying resistor 220 (see FIG. 1A) embedded in the MOV module 12 whose leads are connected to electrical contacts which, in turn, are in electrical contact with mating contacts forming part of the electronic circuitry of the surge strip 2 when the MOV module 12 is mounted on the housing 8 of the surge strip 2 so that the CPU 32 in the surge strip 2 can retrieve from memory 34 the pertinent information relating to that particular MOV module 12 (Step 200).

Then, in accordance with the flow chart shown in FIG. 26, the CPU 32 will measure the leakage current through the MOV module 12 and store this measurement in memory 34 as the "minimum" value, i.e., the normal operating leakage current that is relatively minimal prior to the degradation of the MOVs in the module 12 (Step 202). After that, the CPU 32 determines, using a timer circuit, for example, whether it is time to measure the leakage current again (Step 204). This may be accomplished in several ways. One way may be to take measurements based on a set time interval (e.g., once every day, week, etc.). Another method would be to take measurements based on the occurrence of an event, such as a power surge having been received and absorbed by the MOV module 12. Such a surge may be detected with the circuit shown in FIG. 19 and in accordance with the method described previously. Furthermore, it is envisioned to have the CPU 32 take more frequent measurements during periods of overvoltage conditions, as the MOV or MOVs within the MOV module 12 may be more stressed during such overvoltages.

If the CPU 32 determines that it is indeed time to measure the leakage current again, the CPU 32 performs a routine where the leakage current of the MOV module 12 is measured (Step 206). Then, the CPU takes these measurements and calculates whether the leakage current reading is above, below or within the predetermined limits (the red alarm limit and the yellow alarm limit, for example) (Step 208).

The CPU 32 compares the measured leakage current to the red alarm limit (Step 210). If it is determined by the CPU 32 that the leakage current is greater than the red alarm limit, which is envisioned to be a more critical situation, where the red alarm limit corresponds to a higher leakage current threshold than the leakage current threshold corresponding to the yellow alarm limit, then the CPU 32 will cause an indicator, such as light 24, on the surge strip 2 to illuminate with a red color, or more preferably, will cause a signal to be transmitted from the surge strip 2 to the central control unit 42 and will cause a red LED alarm indicator 211 (see FIG. 4A) on the housing 64 of the central control unit 42 to illuminate (Step 212) in order to alert the user of the impending failure of the MOV module 12 and the immediate need to replace the module.

However, if the leakage current measured by the CPU 32 of the surge strip 2 is not greater than the higher red alarm limit threshold, then the CPU compares the leakage current to the yellow alarm limit threshold (Step 212). If the leakage current measured by the CPU 32 is found to be greater than the lower yellow alarm limit threshold (corresponding to a lower leakage current value than the red alarm limit threshold), then the CPU 32 in the surge strip 2 will cause an indicator, such as light 24, on the surge strip 2 to illuminate with a yellow color, or more preferably, will transmit a signal to the central control unit 42 to illuminate a yellow LED alarm indicator 213 (see FIG. 4A) on the housing 64 of the central control unit 42 to provide a cautionary indication to the user that one or more MOVs in the MOV module 12 is beginning to fail and that the MOV module 12 should be replaced (Step 214).

It should be noted that in the flow chart shown in FIG. 26, with any subsequent powering up of the surge strip 12, there may be no further need to obtain, store or retrieve the pertinent information relating to the MOV module 12 and to determine the minimum leakage current shown in Steps 200 and 202, respectively.

The home control protection system of the present invention is also quite advantageous in many other respects, such as monitoring the current drawn by equipment connected to each surge strip in a particular location of the user's home or office, setting timers to control particular electrical equipment or appliances connected to a surge strip of the home control protection system practically anywhere in the user's home or office, and ensuring that proper protection of the electrical equipment from power surges is always maintained and may be upgraded.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A home control protection system, which comprises:
   at least one surge protection strip having a plurality of power outlet receptacles and being electrically connectible to a source of power, the at least one surge protection strip including:
   a housing, the plurality of power outlet receptacles being mounted on the housing, the housing defining an internal cavity;
   an electronic circuit at least partially situated within the internal cavity of the housing, the electronic circuit providing surge protected power to each power outlet receptacle;
   a removable surge protector module mounted on the housing and electrically coupled to the electronic circuit, the surge protector module being removable from the housing and electrically disconnectable from the electronic circuit by a user of the home control protection system, and being replaceable by the user with another surge protector module, the surge protector module having one or more surge protection devices which selectively change from a high impedance state to a low impedance state when the at least one surge protection strip receives a power surge at least equal to a predetermined magnitude from the source of power to which it is connectable, the electronic circuit including:
   means for counting the number of power surges at least equal to the predetermined magnitude received by the at least one surge protection strip and providing a counted number of power surges signal in response thereto;
   means for determining the rate of power surges at least equal to the predetermined magnitude received by the at least one surge protection strip in response to the counted number of power surges signal, and providing a rate of power surges signal in response thereto;
   means for storing a threshold maximum power surge number corresponding to a predicted maximum number of power surges before failure of the one or more surge protection devices of the surge protection module will occur;
   means for estimating the viability of the one or more surge protection devices of the surge protector module in response to at least the counted number of power surges signal and the threshold maximum power surge number, and providing a surge protection viability signal in response thereto;
   means for determining a projected relative time when the one or more surge protection devices of the surge protector module will fail by being incapable of selectively changing from a high impedance state to a low impedance state in response to at least the counted number of power surges signal, the threshold maximum power surge number and the rate of power surges signal, and providing a projected failure time signal in response thereto; and
   a central control unit in electrical communication with the at least one surge protection strip, the central control unit including:
   means for indicating to the user of the home control protection system an estimated viability of the one or more surge protection devices of the surge protector module of the at least one surge protection strip in response to the surge protection viability signal; and
   means for indicating to at least one of the user of the home control protection system and a third party to replace the surge protector module of the at least one surge protection strip in response to the projected failure time signal.

2. A home control protection system as defined by claim 1, wherein the one or more surge protection devices of the surge protector module of the at least one surge protection strip include a metal oxide varistor.

3. A home control protection system as defined by claim 1, wherein the means for counting the number of power surges includes a microcontroller.

4. A home control protection system as defined by claim 1, wherein the means for determining the rate of power surges includes a microcontroller.

5. A home control protection system as defined by claim 1, wherein the means for storing a threshold maximum power surge number includes a memory.

6. A home control protection system as defined by claim 1, wherein the means for estimating the viability of the one or more surge protection devices includes a microcontroller.

7. A home control protection system as defined by claim 1, wherein the means for determining a projected relative time when the one or more surge protection devices of the surge protector module will fail includes a microcontroller.

8. A home control protection system as defined by claim 1, wherein the means for indicating to a user of the home control protection system an estimated viability of the one or more surge protection devices of the surge protector module includes a display.

9. A home control protection system as defined by claim 1, wherein the means for indicating to at least one of the user of the home control protection system and a third party to replace to the surge protector module includes a display.

10. A home control protection system as defined by claim 1, wherein the means for indicating to at least one of the user of the home control protection system and a third party to replace to the surge protector module includes an internet connection.

11. A home control protection system as defined by claim 1, wherein the means for estimating the viability of the one or more surge protection devices of the surge protector module includes a comparator which compares a counted number of power surges corresponding to the counted number of power surges signal and the threshold maximum power surge number, the comparator generating the surge protection viability signal in response to the comparison thereof, and wherein the means for indicating to a user of the home control protection system an estimated viability of the one or more surge protection devices of the surge protector module indicates to the user the viability of the one or more surge protection devices of the surge protector module as a percentage.

12. A home control protection system, which comprises:
at least one surge protection strip having a plurality of power outlet receptacles and being electrically connectible to a source of power, the at least one surge protection strip including:
a housing, the plurality of power outlet receptacles being mounted on the housing, the housing defining an internal cavity;
an electronic circuit at least partially situated within the internal cavity of the housing, the electronic circuit providing surge protected power to each power outlet receptacle;
a removable surge protector module mounted on the housing and electrically coupled to the electronic circuit, the surge protector module being removable from the housing and electrically disconnectable from the electronic circuit by a user of the home control protection system, and being replaceable by the user with another surge protector module, the surge protector module having one or more surge protection devices which selectively change from a high impedance state to a low impedance state when the at least one surge protection strip receives a power surge at least equal to a predetermined magnitude from the source of power to which it is connectable, the electronic circuit including:
means for estimating the viability of the one or more surge protection devices of the surge protector module, and providing a surge protection viability signal in response thereto;
a central control unit in electrical communication with the at least one surge protection strip, the central control unit including:
means for indicating to at least one of the user of the home control protection system and a third party to replace the surge protector module of the at least one surge protection strip in response to the surge protection viability signal.

13. A home control protection system as defined by claim 12, wherein the means for estimating the viability of the one or more surge protection devices of the surge protector module includes:
means for measuring the impedance of the one or more surge protection devices of the surge protector module, and providing a measured impedance signal corresponding to the measured impedance of the one or more surge protection devices of the surge protector module; and
means for comparing the measured impedance of the one or more surge protection devices of the surge protector module in response to the measured impedance signal and a known normal impedance value corresponding to the one or more protection devices of the surge protector module, and providing a comparator output signal indicative of the measured impedance being below the known normal impedance value, the surge protection viability signal being based in part on the comparator output signal.

14. A home control protection system as defined by claim 13, wherein the means for measuring the impedance of the one or more surge protection devices of the surge protector module includes a voltage divider network, the voltage divider network having the one or more surge protection devices of the surge protector module connected in series with a known impedance, the voltage divider network providing a voltage divider signal to the electronic circuitry.

15. A home control protection system as defined by claim 14, wherein the means for measuring the impedance of the one or more surge protection devices of the surge protector module further includes means for selectively providing the voltage divider signal to the electronic circuitry.

16. A home control protection system as defined by claim 15, wherein the means for selectively providing the voltage divider signal to the electronic circuit includes a timer circuit for periodically selectively providing the voltage divider signal to the electronic circuit.

17. A method of monitoring the surge protection afforded by a home control protection system, the home control protection system having at least one surge protection strip having a plurality of power outlet receptacles and being electrically connectible to a source of power, the at least one surge protection strip including a housing, the plurality of power outlet receptacles being mounted on the housing, the housing defining an internal cavity, an electronic circuit at least partially situated within the internal cavity of the housing, the electronic circuit providing surge protected power to each power outlet receptacle, a removable surge protector module mounted on the housing and electrically coupled to the electronic circuit, the surge protector module being removable from the housing and electrically disconnectable from the electronic circuit by a user of the home control protection system, and being replaceable by the user with another surge protector module, the surge protector module having one or more surge protection devices which selectively change from a high impedance state to a low impedance state when the at least one surge protection strip receives a power surge at least equal to a predetermined magnitude from the source of power to which it is connectable, and a central control unit in electrical communication with the at least one surge protection strip, the method comprising the steps of:
counting the number of power surges at least equal to the predetermined magnitude received by the at least one surge protection strip and providing a counted number of power surges signal in response thereto;
determining the rate of power surges at least equal to the predetermined magnitude received by the at least one surge protection strip in response to the counted number of power surges signal, and providing a rate of power surges signal in response thereto;
storing a threshold maximum power surge number corresponding to a predicted maximum number of power surges before failure of the one or more surge protection devices of the surge protection module will occur;
estimating the viability of the one or more surge protection devices of the surge protector module in response to at least the counted number of power surges signal and the threshold maximum power surge number, and providing a surge protection viability signal in response thereto;
determining a projected relative time when the one or more surge protection devices of the surge protector module will fail by being incapable of selectively changing from a high impedance state to a low impedance state in response to at least the counted number of power surges signal, the threshold maximum power surge number and the rate of power surges signal, and providing a projected failure time signal in response thereto;
indicating to the user of the home control protection system an estimated viability of the one or more surge protection devices of the surge protector module of the at least one surge protection strip in response to the surge protection viability signal; and
indicating to at least one of the user of the home control protection system and a third party to replace the surge protector module of the at least one surge protection strip in response to the projected failure time signal.

18. A method of monitoring the surge protection afforded by a home control protection system as defined by claim 17, wherein the step of estimating the viability of the one or more surge protection devices of the surge protector module includes the step of comparing a counted number of power surges corresponding to the counted number of power surges signal and the threshold maximum power surge number, and generating the surge protection viability signal in response to the comparison thereof, and wherein the step of indicating to a user of the home control protection system an estimated viability of the one or more surge protection devices of the surge protector module includes the step of indicating to the user the viability of the one or more surge protection devices of the surge protector module as a percentage.

19. A method of monitoring the surge protection afforded by a home control protection system, the home control protection system having at least one surge protection strip having a plurality of power outlet receptacles and being electrically connectible to a source of power, the at least one surge protection strip including a housing, the plurality of power outlet receptacles being mounted on the housing, the housing defining an internal cavity, an electronic circuit at least partially situated within the internal cavity of the housing, the electronic circuit providing surge protected power to each power outlet receptacle, a removable surge protector module mounted on the housing and electrically coupled to the electronic circuit, the surge protector module being removable from the housing and electrically disconnectable from the electronic circuit by a user of the home control protection system, and being replaceable by the user with another surge protector module, the surge protector module having one or more surge protection devices which selectively change from a high impedance state to a low impedance state when the at least one surge protection strip receives a power surge at least equal to a predetermined magnitude from the source of power to which it is connectable, and a central control unit in electrical communication with the at least one surge protection strip, the method comprising the steps of:
- estimating the viability of the one or more surge protection devices of the surge protector module, and providing a surge protection viability signal in response thereto; and
- indicating to at least one of the user of the home control protection system and a third party to replace the surge protector module of the at least one surge protection strip in response to the surge protection viability signal.

20. A home control protection system as defined by claim 19, wherein the step of estimating the viability of the one or more surge protection devices of the surge protector module further includes the steps of:
- measuring the impedance of the one or more surge protection devices of the surge protector module, and providing a measured impedance signal corresponding to the measured impedance of the one or more surge protection devices of the surge protector module; and
- comparing the measured impedance of the one or more surge protection devices of the surge protector module in response to the measured impedance signal and a known normal impedance value corresponding to the one or more protection devices of the surge protector module, and providing a comparison signal indicative of the measured impedance being below the known normal impedance value, the surge protection viability signal being based at least in part on the comparison signal.

21. A method of monitoring the surge protection afforded by a home control protection system as defined by claim 20, wherein the step of measuring the impedance of the one or more surge protection devices of the surge protector module includes the step of connecting the one or more surge protection devices of the surge protector module in series with a known impedance to generate a voltage divider signal, and providing the voltage divider signal to the electronic circuitry.

22. A method of monitoring the surge protection afforded by a home control protection system as defined by claim 21, wherein the step of measuring the impedance of the one or more surge protection devices of the surge protector module further includes the step of selectively providing the voltage divider signal to the electronic circuitry.

23. A method of monitoring the surge protection afforded by a home control protection system as defined by claim 22, wherein the step of selectively providing the voltage divider signal to the electronic circuit includes the step of periodically selectively providing the voltage divider signal to the electronic circuit.

24. A home control protection system, which comprises:
- at least one surge protection strip having a plurality of power outlet receptacles and being electrically connectible to a source of power, the at least one surge protection strip including:
- a housing, the plurality of power outlet receptacles being mounted on the housing, the housing defining an internal cavity;
- an electronic circuit at least partially situated within the internal cavity of the housing, the electronic circuit providing surge protected power to each power outlet receptacle;
- a removable surge protector module mounted on the housing and electrically coupled to the electronic circuit, the surge protector module being removable from the housing and electrically disconnectable from the electronic circuit by a user of the home control protection system, and being replaceable by the user with another surge protector module, the surge protector module having one or more surge protection devices which selectively change from a high impedance state to a low impedance state when the at least one surge protection strip receives a power surge at least equal to a predetermined magnitude from the source of power to which it is connectable, the electronic circuit including:
- means for counting the number of power surges at least equal to the predetermined magnitude received by the at least one surge protection strip and providing a counted number of power surges signal in response thereto;
- means for determining the rate of power surges at least equal to the predetermined magnitude received by the at least one surge protection strip in response to the counted number of power surges signal, and providing a rate of power surges signal in response thereto;
- means for storing a threshold maximum power surge number corresponding to a predicted maximum number of power surges before failure of the one or more surge protection devices of the surge protector module will occur;
- means for estimating the viability of the one or more surge protection devices of the surge protector module in response to at least the counted number of power surges signal and the threshold maximum power surge number, and providing a surge protection viability signal in response thereto;
- means for determining a projected relative time when the one or more surge protection devices of the surge protector module will fail by being incapable of selectively changing from a high impedance state to a low impedance state in response to at least the counted number of power surges signal, the threshold maximum power surge number and the rate of power surges signal, and providing a projected failure time signal in response thereto; and means for monitoring the power consumed over a predetermined period of time by an electrical device connected to at least one power outlet receptacle of the plurality of power outlet receptacles of the at least one surge protection strip, and providing a power consumed signal in response thereto; and a central control unit in electrical communication with the at least one surge protection strip, the central control unit including:

means for indicating to the user of the home control protection system an estimated viability of the one or more surge protection devices of the surge protector module of the at least one surge protection strip in response to the surge protection viability signal;

means for indicating to at least one of the user of the home control protection system and a third party to replace the surge protector module of the at least one surge protection strip in response to the projected failure time signal; and means for indicating to the user of the home control protection system the power consumed over the predetermined period of time by the electrical device connected to the at least one power outlet receptacle of the at least one surge protection strip in response to the power consumed signal.

25. A home control protection system, which comprises:

at least one surge protection strip having a plurality of power outlet receptacles and being electrically connectible to a source of power, the at least one surge protection strip including:

a housing, the plurality of power outlet receptacles being mounted on the housing, the housing defining an internal cavity;

an electronic circuit at least partially situated within the internal cavity of the housing, the electronic circuit providing surge protected power to each power outlet receptacle;

a removable surge protector module mounted on the housing and electrically coupled to the electronic circuit, the surge protector module being removable from the housing and electrically disconnectable from the electronic circuit by a user of the home control protection system, and being replaceable by the user with another surge protector module, the surge protector module having one or more surge protection devices which selectively change from a high impedance state to a low impedance state when the at least one surge protection strip receives a power surge at least equal to a predetermined magnitude from the source of power to which it is connectable, the electronic circuit including:

means for estimating the viability of the one or more surge protection devices of the surge protector module, and providing a surge protection viability signal in response thereto; and means for monitoring the power consumed over a predetermined period of time by an electrical device connected to at least one power outlet receptacle of the plurality of power outlet receptacles of the at least one surge protection strip, and providing a power consumed signal in response thereto; and a central control unit in electrical communication with the at least one surge protection strip, the central control unit including:

means for indicating to at least one of the user of the home control protection system and a third party to replace the surge protector module of the at least one surge protection strip in response to the surge protection viability signal; and means for indicating to the user of the home control protection system the power consumed over the predetermined period of time by the electrical device connected to the at least one power outlet receptacle of the at least one surge protection strip in response to the power consumed signal.

26. A method of monitoring the surge protection afforded by a home control protection system as defined by claim 17, which further comprises the steps of:

monitoring the power consumed over a predetermined period of time by an electrical device connected to at least one power outlet receptacle of the plurality of power outlet receptacles of the at least one surge protection strip, and providing a power consumed signal in response thereto; and indicating to the user of the home control protection system the power consumed over the predetermined period of time by the electrical device connected to the at least one power outlet receptacle of the at least one surge protection strip in response to the power consumed signal.

27. A method of monitoring the surge protection afforded by a home control protection system as defined by claim 19, which further comprises the steps of:

monitoring the power consumed over a predetermined period of time by an electrical device connected to at least one power outlet receptacle of the plurality of power outlet receptacles of the at least one surge protection strip, and providing a power consumed signal in response thereto; and indicating to the user of the home control protection system the power consumed over the predetermined period of time by the electrical device connected to the at least one power outlet receptacle of the at least one surge protection strip in response to the power consumed signal.

28. A home control protection system, which comprises:

at least one surge protection strip having a plurality of power outlet receptacles and being electrically connectible to a source of power, the at least one surge protection strip including:

a housing, the plurality of power outlet receptacles being mounted on the housing, the housing defining an internal cavity;

an electronic circuit at least partially situated within the internal cavity of the housing, the electronic circuit providing surge protected power to each power outlet receptacle;

a removable surge protector module mounted on the housing and electrically coupled to the electronic circuit, the surge protector module being removable from the housing and electrically disconnectable from the electronic circuit by a user of the home control protection system, and being replaceable by the user with another surge protector module, the surge protector module having one or more surge protection devices which selectively change from a high impedance state to a low impedance state when the at least one surge protection strip receives a power surge at least equal to a predetermined magnitude from the source of power to which it is connectable, the electronic circuit including:

a microcontroller, the microcontroller counting the number of power surges at least equal to the predetermined magnitude received by the at least one surge protection strip and providing a counted number of power surges signal in response thereto, the microcontroller further determining the rate of power surges at least equal to the predetermined magnitude received by the at least one surge protection strip in response to the counted number of power surges signal, and providing a rate of power surges signal in response thereto; and a memory electrically coupled to the microcontroller, the memory storing a threshold maximum power surge number corresponding to a predicted maximum number of power surges before failure of the one or more surge protection devices of the surge protector module will occur, the microcontroller further estimating the viability of the one or more surge protection devices of the surge protector module in response to at least the counted number of power surges signal and the threshold maximum power surge number, and providing a surge protection viability signal in response thereto, the microcontroller further determining a projected relative time when the one or more surge protection devices of the surge protector module will fail by being incapable of selectively changing from a high impedance state to a low impedance state in response to at least the counted number of power surges signal, the threshold maximum power surge number and the rate of power surges signal, and providing a projected failure time signal in response thereto; and a central control unit in electrical communication with the at least one surge protection strip, the central control unit including:

a display, the display indicating to the user of the home control protection system an estimated viability of the one or more surge protection devices of the surge protector module of the at least one surge protection strip in response to the surge protection viability signal, the display further indicating to at least one of the user of the home control protection system and a third party to replace the surge protector module of the at least one surge protection strip in response to the projected failure time signal.

29. A home control protection system, which comprises:

at least one surge protection strip having a plurality of power outlet receptacles and being electrically connectible to a source of power, the at least one surge protection strip including:

a housing, the plurality of power outlet receptacles being mounted on the housing, the housing defining an internal cavity;

an electronic circuit at least partially situated within the internal cavity of the housing, the electronic circuit providing surge protected power to each power outlet receptacle;

a removable surge protector module mounted on the housing and electrically coupled to the electronic circuit, the surge protector module being removable from the housing and electrically disconnectable from the electronic circuit by a user of the home control protection system, and being replaceable by the user with another surge protector module, the surge protector module having one or more surge protection devices which selectively change from a high impedance state to a low impedance state when the at least one surge protection strip receives a power surge at least equal to a predetermined magnitude from the source of power to which it is connectable, the electronic circuit including:

a microcontroller, the microcontroller estimating the viability of the one or more surge protection devices of the surge protector module, and providing a surge protection viability signal in response thereto; and a central control unit in electrical communication with the at least one surge protection strip, the central control unit including:

a display, the display indicating to at least one of the user of the home control protection system and a third party to replace the surge protector module of the at least one surge protection strip in response to the surge protection viability signal.

30. A home control protection system as defined by claim 24, wherein the means for monitoring the power consumed over a predetermined period of time by an electrical device connected to at least one power outlet receptacle of the plurality of power outlet receptacles of the at least one surge protection strip includes a current sensor, the current sensor being electrically connected to the at least one power outlet receptacle of the plurality of power outlet receptacles and sensing the magnitude of the current provided to the at least one power outlet receptacle.

31. A home control protection system as defined by claim 25, wherein the means for monitoring the power consumed over a predetermined period of time by an electrical device connected to at least one power outlet receptacle of the plurality of power outlet receptacles of the at least one surge protection strip includes a current sensor, the current sensor being electrically connected to the at least one power outlet receptacle of the plurality of power outlet receptacles and sensing the magnitude of the current provided to the at least one power outlet receptacle.

32. A home control protection system as defined by claim 1, wherein the electronic circuit of the at least one surge protection strip further includes a transceiver for transmitting signals to and receiving signals from the central control unit; and wherein the central control unit includes a transceiver for transmitting signals to and receiving signals from the at least one surge protection strip.

33. A home control protection system as defined by claim 32, which further comprises:

means for selectively controlling the power provided to at least one power outlet receptacle of the plurality of power outlet receptacles of the at least one surge protection strip.

34. A home control protection system as defined by claim 33, wherein the means for selectively controlling the power provided to at least one power outlet receptacle of the plurality of power outlet receptacles of the at least one surge protection strip includes a switching circuit, the switching circuit being selectively switchable between a first state in which the surge protection strip provides power to the at least one power outlet receptacle, and a second state in which the surge protection strip provides no power to the at least one power outlet receptacle, the switching circuit being selectively switchable between the first and second states in response to a signal transmitted by the transceiver of the central control unit and received by the transceiver of the at least one surge protection strip.

35. A home control protection system as defined by claim 12, wherein the electronic circuit of the at least one surge protection strip further includes a transceiver for transmitting signals to and receiving signals from the central control unit; and wherein the central control unit includes a transceiver for transmitting signals to and receiving signals from the at least one surge protection strip.

36. A home control protection system as defined by claim 35, which further comprises:

means for selectively controlling the power provided to at least one power outlet receptacle of the plurality of power outlet receptacles of the at least one surge protection strip.

37. A home control protection system as defined by claim 36, wherein the means for selectively controlling the power provided to at least one power outlet receptacle of the plurality of power outlet receptacles of the at least one surge protection strip includes a switching circuit, the switching circuit being selectively switchable between a first state in which the surge protection strip provides power to the at least one power outlet receptacle, and a second state in which the surge protection strip provides no power to the at least one power outlet receptacle, the switching circuit being selectively switchable between the first and second states in response to a signal transmitted by the transceiver of the central control unit and received by the transceiver of the at least one surge protection strip.

38. A method of monitoring the surge protection afforded by a home control protection system as defined by claim 17, which further comprises the steps of:

transmitting signals by the at least one surge protection strip to the central control unit;

receiving signals by the at least one surge protection strip from the central control unit;

transmitting signals by the central control unit to the at least one surge protection strip; and receiving signals by the central control unit from the at least one surge protection strip.

39. A method of monitoring the surge protection afforded by a home control protection system as defined by claim 38, which further comprises the step of:

selectively controlling the power provided to at least one power outlet receptacle of the plurality of power outlet receptacles of the at least one surge protection strip.

40. A method of monitoring the surge protection afforded by a home control protection system as defined by claim 39, wherein the step of selectively controlling the power provided to at least one power outlet receptacle of the plurality of power outlet receptacles of the at least one surge protection strip includes the step of selectively switching a switchable portion of the electronic circuit of the at least one surge protection circuit between a first state in which the surge protection strip provides power to the at least one power outlet receptacle, and a second state in which the surge protection strip provides no power to the at least one power outlet receptacle, the switchable portion of the electronic circuit being selectively switchable between the first and second states in response to a signal transmitted by the central control unit and received by the at least one surge protection strip.

41. A method of monitoring the surge protection afforded by a home control protection system as defined by claim 19, which further comprises the steps of:

transmitting signals by the at least one surge protection strip to the central control unit;

receiving signals by the at least one surge protection strip from the central control unit;

transmitting signals by the central control unit to the at least one surge protection strip; and receiving signals by the central control unit from the at least one surge protection strip.

42. A method of monitoring the surge protection afforded by a home control protection system as defined by claim 41, which further comprises the step of:

selectively controlling the power provided to at least one power outlet receptacle of the plurality of power outlet receptacles of the at least one surge protection strip.

43. A method of monitoring the surge protection afforded by a home control protection system as defined by claim 42, wherein the step of selectively controlling the power provided to at least one power outlet receptacle of the plurality of power outlet receptacles of the at least one surge protection strip includes the step of selectively switching a switchable portion of the electronic circuit of the at least one surge protection circuit between a first state in which the surge protection strip provides power to the at least one power outlet receptacle, and a second state in which the surge protection strip provides no power to the at least one power outlet receptacle, the switchable portion of the electronic circuit being selectively switchable between the first and second states in response to a signal transmitted by the central control unit and received by the at least one surge protection strip.

\* \* \* \* \*